(12) United States Patent
Tanaka

(10) Patent No.: US 9,950,337 B2
(45) Date of Patent: Apr. 24, 2018

(54) DISCHARGE SYSTEM

(71) Applicant: Heishin Ltd., Kobe-shi, Hyogo (JP)

(72) Inventor: Yusuke Tanaka, Nagahama (JP)

(73) Assignee: HEISHIN LTD., Kobe-shi (JP)

( * ) Notice: Subject to any disclaimer, the term of this patent is extended or adjusted under 35 U.S.C. 154(b) by 0 days.

(21) Appl. No.: 15/033,085

(22) PCT Filed: Sep. 30, 2014

(86) PCT No.: PCT/JP2014/076029
§ 371 (c)(1),
(2) Date: Apr. 28, 2016

(87) PCT Pub. No.: WO2015/064273
PCT Pub. Date: May 7, 2015

(65) Prior Publication Data
US 2016/0279660 A1    Sep. 29, 2016

(30) Foreign Application Priority Data

Oct. 29, 2013  (JP) ................................. 2013-224660
Jul. 22, 2014   (JP) ................................. 2014-148658

(51) Int. Cl.
*B05C 11/10*     (2006.01)
*B05B 12/14*     (2006.01)
(Continued)

(52) U.S. Cl.
CPC .............. *B05C 11/10* (2013.01); *B05B 12/14* (2013.01); *B05C 5/0216* (2013.01);
(Continued)

(58) Field of Classification Search
CPC .. B05B 12/14; B05B 13/0431; B05C 11/1047
(Continued)

(56) References Cited

U.S. PATENT DOCUMENTS

2014/0144545 A1* 5/2014 Tarantini ................. B05B 12/14
141/18
2015/0251208 A1* 9/2015 Tanaka .................. B05C 5/0212
141/18

(Continued)

FOREIGN PATENT DOCUMENTS

JP           57-6873 Y2    2/1982
JP        2004-154733 A    6/2004
(Continued)

OTHER PUBLICATIONS

ISA/JP, International Search Report dated Dec. 9, 2014 in International Application No. PCT/JP2014/076029, total 4 pages including translation.

*Primary Examiner* — Timothy L Maust
*Assistant Examiner* — Timothy P Kelly
(74) *Attorney, Agent, or Firm* — Masuvalley & Partners

(57) ABSTRACT

The purpose is to provide a discharge system that adopts an optimal structure for connecting a discharging device to a refilling device in a substantially aligned fashion by moving the discharging device. A discharge system includes a discharging device, a refilling device, a discharge-side coupler, a refill-side coupler, and a manipulator. The discharge-side coupler is connectable to the refill-side coupler by relatively moving the discharge-side coupler in an axial line N direction of the refill-side coupler and fluid can be refilled from the refilling device side to the discharging device side. A coupling position between the manipulator and the discharging device reaches on the axial line N when connecting the refill-side coupler and the discharge-side coupler.

5 Claims, 16 Drawing Sheets

(51) Int. Cl.
    *B05C 5/02*       (2006.01)
    *F16L 37/34*     (2006.01)
    *B05B 13/04*     (2006.01)

(52) U.S. Cl.
    CPC .......... *B05C 11/1047* (2013.01); *F16L 37/34* (2013.01); *B05B 13/0431* (2013.01); *B05C 5/0225* (2013.01)

(58) Field of Classification Search
    USPC .......................................... 141/18, 20.5, 27
    See application file for complete search history.

(56) References Cited

U.S. PATENT DOCUMENTS

| | | | |
|---|---|---|---|
| 2015/0266048 A1* | 9/2015 | Tanaka | B05C 5/0212 222/192 |
| 2016/0263615 A1* | 9/2016 | Tanaka | B05C 11/10 |
| 2016/0271641 A1* | 9/2016 | Tanaka | B05C 11/10 |
| 2016/0279661 A1* | 9/2016 | Tanaka | B05C 11/10 |

FOREIGN PATENT DOCUMENTS

| | | | | |
|---|---|---|---|---|
| JP | 2007-275769 A | 10/2007 | | |
| WO | WO 2013004792 A1 * | 1/2013 | ........... | B05B 15/025 |

\* cited by examiner

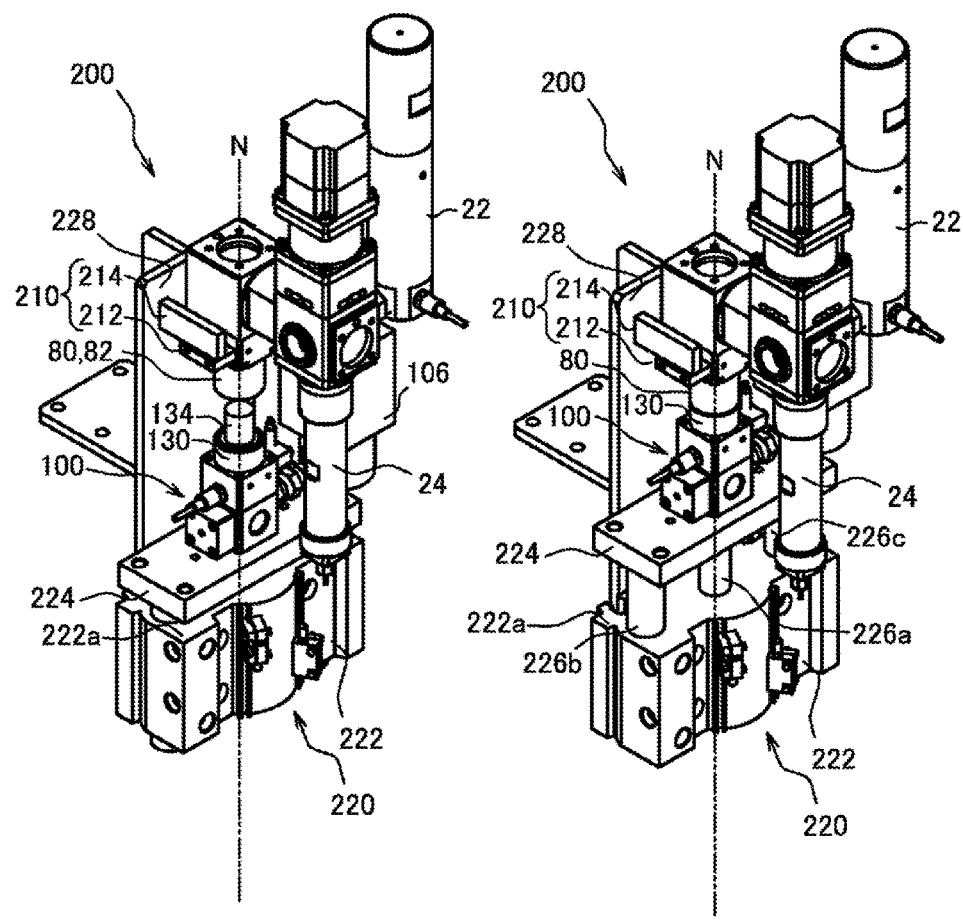

DISCHARGE SYSTEM

This application is the U.S. National Phase of International Patent Application No. PCT/JP2014/076029, filed on Sep. 30 2014, entitled "DISCHARGING SYSTEM," and claims priority under 35 U.S.C. § 119 to Japanese Patent Application No. 2013-224660, filed Oct. 29, 2013 and Japanese Patent Application No. 2014-148658, filed Jul. 22, 2014, which are hereby expressly incorporated by reference in their entirety for all purposes.

TECHNICAL FIELD

The present invention relates to a discharge system capable of using fluid, for example, capable of applying fluid, such as sealing agent or adhesive, to various components at an automobile assembly plant etc., or refilling a container with fluid, such as grease.

BACKGROUND ART

Conventionally, as listed below, a device and a method for applying a functional fluid material disclosed in Patent Document 1: JP2004-154733A, or a connector for fluid, an application device, etc. which are disclosed in Patent Document 2: JP2007-275769A, are used for applications in which fluid, such as sealing agent or adhesive, is applied at an automobile assembly plant etc. The application device according to Patent Document 1 is comprised of an application unit and a refilling unit. In this application device, the application unit has a discharge gun which discharges the functional fluid material, and a feeder which supplies the functional fluid material to the discharge gun. The refilling unit refills the functional fluid material from a refilling port to a refilling tube part. By adopting such a structure, a long-distance piping for supplying the functional fluid material to the discharge gun is no longer necessary, and a significant shortening of piping length is achieved, and a temperature adjusting device for temperature control of the fluid material and a fluid-feeding pump are made necessary minimum.

Purposes of the fluid connector and the application device which are disclosed in Patent Document 2 are also to eliminate a large-scale piping installation for supplying the fluid from a tank to a discharger, and a high-pressure pump for carrying the fluid, similar to Patent Document 1. The conventional art of Patent Document 2 is provided with first to third feeding parts for supplying the fluid, such as sealing agent, and first to third dischargers, which are detachably attached to the respective first to third feeding parts etc. via fluid connectors. The first to third dischargers have tanks for storing the fluid supplied from the feeding parts to which the first to third dischargers are attached, respectively, and are dischargeable of the fluid from the tanks. The first to third dischargers are attachable and detachable to/from an arm of a robot via a second connector, respectively.

As described above, various discharge systems are provided in which the discharging device for discharging the discharge fluid and the refilling device for refilling the discharging device with the fluid are provided so as to be connectable and disconnectable, and the fluid is refillable from the refilling device side to the discharging device side by connecting both the devices.

Here, in the discharge system as described above, in order to prevent problems, such as leaks of the fluid during the refilling operation, and wear of a coupler on the refilling device side (hereinafter, also referred to as "the refill-side coupler") and a coupler on the discharging device side (hereinafter, also referred to as "the discharge-side coupler") associated with mutual sliding of the couplers, it is desirable to configure the refill-side coupler and the discharge-side coupler so that they are connected to each other without causing an offset of the axial centers thereof (axial offset). Thus, it is desirable to move the coupler provided to the discharging device side so as to be substantially aligned with the coupler provided to the refilling device side, and then connect the couplers. However, in the conventional arts, there is no measures against the axial offset and, thus, there is a problem that a poor connection may be caused between the discharging device and the refilling device.

Thus, one purpose of the present invention is to provide a discharge system that adopts an optimal structure for connecting a discharging device to a refilling device in a substantially aligned fashion.

SUMMARY OF THE INVENTION

Here, in a case where a discharge-side coupler is relatively moved in an axial line direction of a refill-side coupler so as to connect the discharge-side coupler and the refill-side coupler, in order to surely connect a discharging device to a refilling device, it is desirable that a point of action of an external force acted on the discharge-side coupler when connecting, exists on the axial line of the refill-side coupler described above so that the discharge-side coupler can move toward the refill-side coupler along the axial line direction described above.

In accordance with one aspect of the present invention, based on the knowledge described above, a discharge system includes a discharging device capable of discharging fluid, a refilling device capable of refilling the discharging device with the fluid, a discharge-side coupler provided to the discharging device side, a refill-side coupler provided to the refilling device side, and a manipulator for moving the discharging device. The refill-side coupler and the discharge-side coupler are connected to each other by relatively moving in a given axial line direction, and the discharging device side is refillable with the fluid from the refilling device side. A force acting in association with the connection of the refill-side coupler and the discharge-side coupler acts on the axial line.

According to such a configuration, the discharge-side coupler can be connected to the refill-side coupler so as to substantially be aligned with each other. Therefore, a poor connection of the discharge-side coupler to the refill-side coupler can be prevented. Further, problems such as leaks of the fluid during the refilling operation, and wear of the refill-side coupler and the discharge-side coupler associated with sliding of the couplers can be solved.

Further, in this embodiment, a coupling position between the manipulator and the discharging device may reach on the axial line when connecting the refill-side coupler and the discharge-side coupler.

In the discharge system of the present invention, the coupling position between the manipulator and the discharging device comes to a position on the axial line when connecting the discharge-side coupler to the refill-side coupler. Thus, when connecting the discharge-side coupler to the refill-side coupler, the external force acts in the axial line direction on the axial line and the discharge-side coupler can be connected to the refill-side coupler so as to substantially be aligned with each other. Therefore, according to the present invention, the poor connection of the discharge-side coupler to the refill-side coupler can be prevented and problems such as the leaks of the fluid and the wear of each coupler can be solved.

In one embodiment, the discharging device may include a uniaxial eccentric screw pump having a male screw rotor that is eccentrically rotated by a drive force, and a stator of which an inner circumferential surface is formed in a female screw.

In this embodiment, the discharge system may include a moving device for moving the refill-side coupler in the axial line direction, and a disconnection preventive mechanism for preventing a disconnection between the discharging device and the refilling device. The disconnection preventive mechanism may include a stopped part provided to the discharging device and a stopper part that is stoppable of the stopped part. When the stopped part is stopped by the stopper part, the refill-side coupler and the discharge-side coupler may be connectable to each other by moving the refill-side coupler in the axial line direction while prohibiting a movement of the discharging device in a direction separating from the refilling device.

According to such a configuration, the discharging device is held so as not to separate from the refilling device during the refilling operation of the fluid, and a load associated with the connection of the discharge-side coupler and the refill-side coupler, or the refilling of the fluid can be prevented from acting on the manipulator.

In the discharge system of the present embodiment, the stopper part may be stoppable by contacting the stopped part from rear in the axial line direction.

According to such a configuration, the load associated with the connection of the discharge-side coupler and the refill-side coupler, or the refilling of the fluid can be received properly by the disconnection preventive mechanism.

According to the embodiments of the present invention, a discharge system can be provided, which adopts an optimal structure for surely connecting a discharging device to a refilling device by moving the discharging device.

BRIEF DESCRIPTION OF THE DRAWINGS

FIG. 2A is a left-side view, FIG. 2B is a front view, FIG. 2C is a cross-sectional view, and FIG. 2D is a perspective view (illustration of a bracket is omitted in FIG. 2D).

FIG. 3A is a front view, FIG. 3B is a cross-sectional view, FIG. 3C is a perspective view, and FIG. 3D is a plan view.

FIG. 6A is a front view, FIG. 6B is a right-side view, FIG. 6C is a plan view, and FIG. 6D is a cross-sectional view.

FIG. 9A is a side view before connecting, FIG. 9B is a side view after connected, and FIGS. 9C-9D are cross-sectional views illustrating a substantial part of FIGS. 9A-9B, respectively.

FIGS. 15A-15B are perspective views illustrating the discharge system of FIGS. 14A-14B, seen from a front left side, where FIG. 15A is a view before connecting a discharge-side coupler to a refill-side coupler, and FIG. 15B is a view after the connection.

FIG. 16A is a view before connecting the discharge-side coupler to the refill-side coupler, and FIG. 16B is a view after the connection.

DETAILED DESCRIPTION OF THE INVENTION

[Configuration of Discharge System 10]

Figure 1:
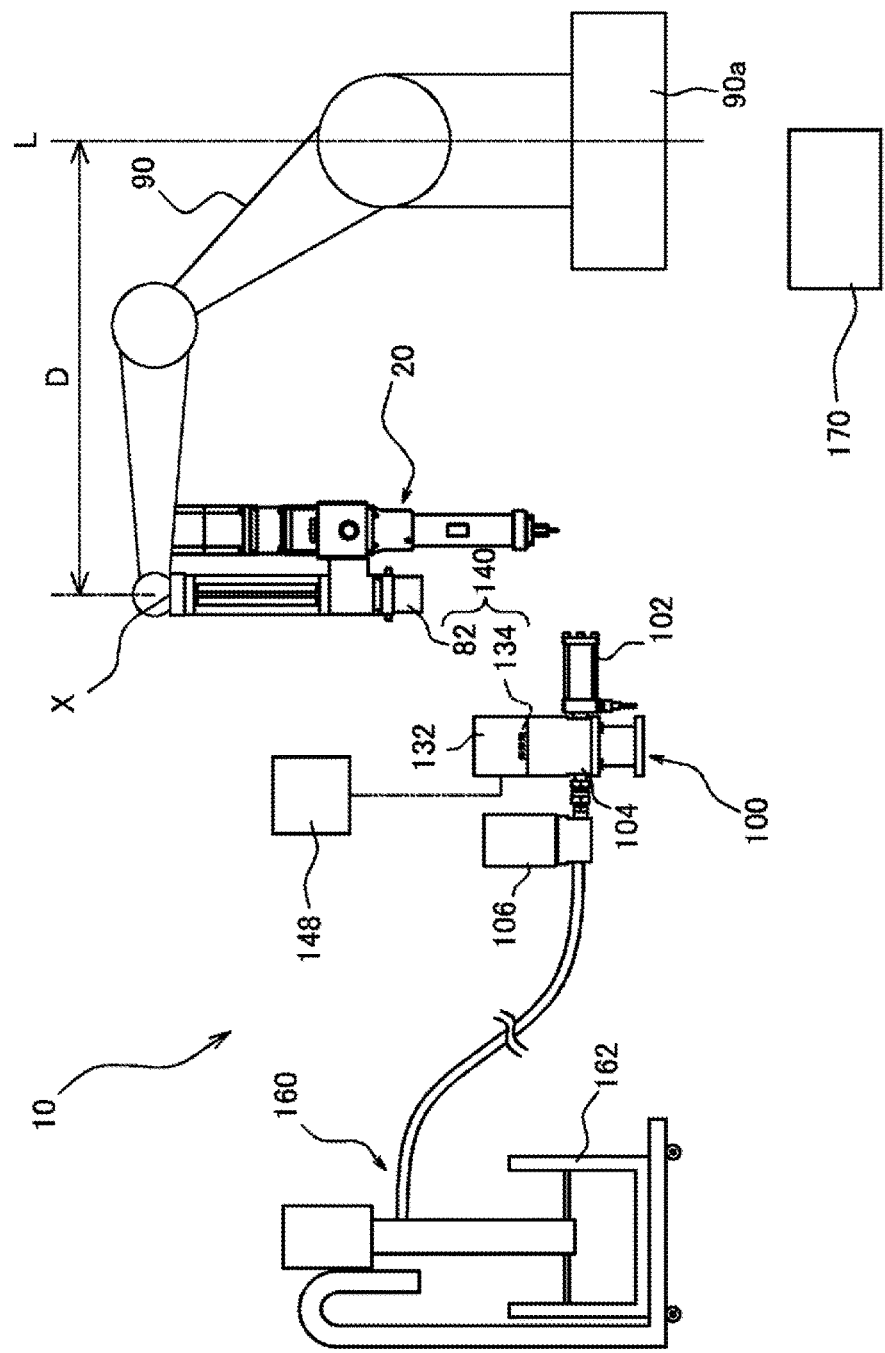
FIG. 1 is a diagram schematically illustrating a discharge system according to one embodiment of the present invention.

Hereinafter, a discharge system 10 according to one embodiment of the present invention is described in detail, referring to the accompanying drawings. As illustrated in FIG. 1, the discharge system 10 includes the discharging device 20, the refilling device 100, a fluid feeder 160, and a controller 170, as primary components. The discharge system 10 is capable of refilling the discharging device 20 with fluid which is supplied from the fluid feeder 160, by connecting the discharging device 20 to the refilling device 100. The discharge system 10 is capable of discharging the refilled fluid for an application purpose by being operated in a state where discharging device 20 is disconnected from the refilling device 100. That is, the discharge system 10 has a system configuration which is capable of applying the fluid by actuating the discharging device 20 independently from the refilling device 100 or the fluid feeder 160 in a state where piping, a hose or the like for fluid supply is not connected to the discharging device 20.

As illustrated in FIGS. 2A-2D, the discharging device 20 includes a discharge-side buffer part 22 (shock absorber), a discharge part 24, a discharge-side detachable part 26, and a bracket 28. The discharge-side buffer part 22 is provided to buffer fluctuation of an internal pressure of the discharging device 20 associated with a connection or disconnection of the discharging device 20 to/from the refilling device 100 in order to refill the discharge part 24 with the fluid for discharge. Although the discharge-side buffer part 22 may be comprised of a container, such as a tank, a component which is provided with a cylinder mechanism 30 as illustrated in FIGS. 3A-3D is adopted as the discharge-side buffer part 22 in this embodiment.

Figure 3:
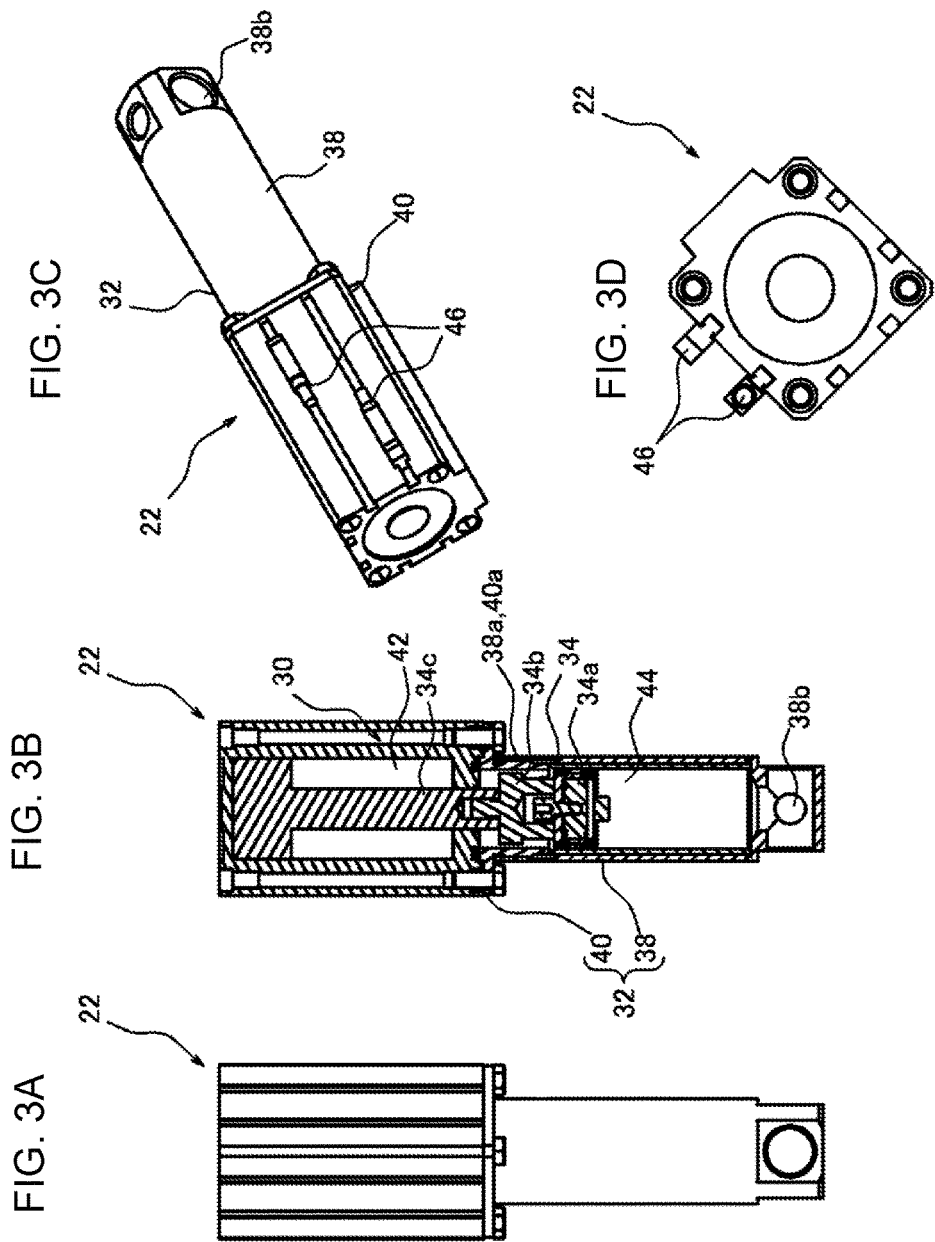
FIGS. 3A-3D are views illustrating a discharge-side buffer part which is adopted to the discharging device of as shown in FIGS. 2A-2D, where

Specifically, as illustrated in FIG. 3B, the discharge-side buffer part 22 includes the cylinder mechanism 30 comprised of a so-called air cylinder. The cylinder mechanism 30 includes a casing 32 and a piston 34. As illustrated in FIG. 3C, the discharge-side buffer part 22 is capable of supplying compressed air from an air supply which is a drive source.

As illustrated in FIG. 3B, the casing 32 is a container comprised of a combination of a lower casing 38 and an upper casing 40. A female thread 38a and a male thread 40a are formed in connecting parts of the lower casing 38 and the upper casing 40, respectively, and the casing 32 is assembled by threadedly engaging the threads. A connecting part 38b is provided in a lower end part of the lower casing 38 (opposite from the female thread 38a).

The piston 34 is freely slidable inside the casing 32 in axial directions of the casing 32. The piston 34 is constructed by connecting a piston rod 34c to a piston body 34a via a piston adapter 34b. The piston 34 divides a space inside the casing 32 to a first chamber 42 on the upper casing 40 side and a second chamber 44 on the lower casing 38 side. The first chamber 42 is a section where the compressed air supplied from the air supply as the drive source is introduced via a port 46 formed in the casing 32, and the second chamber 44 is a section where the fluid inflows and outflows. The cylinder mechanism 30 varies a capacity of the second chamber 44 by actuating the drive source. The second chamber 44 communicates with the connecting part 38b, and the fluid can inflow and outflow into/from the second chamber 44 via the connecting part 38b.

The discharge-side buffer part 22 is provided with a refilled amount detector (not illustrated) for detecting a refilled amount based on the position of the piston 34. The refilled amount detector may be comprised of any kind of component. Specifically, an auto switch may be adopted as the refilled amount detector, which switches contacts between an ON state and an OFF state as a magnet (not illustrated) provided to the piston 34 enters and leaves into/from a detection range, and the auto switch may be provided at an upper limit position and a lower limit position of a range where the piston 34 is movable, respectively. Alternatively, a pressure sensor which can detect the internal pressure of the discharge-side buffer part 22 may be adopted as the refilled amount detector. In this case, an upper limit and a lower limit of the internal pressure may be determined beforehand, and the piston 34 can be determined to be reached the upper limit position when the internal pressure reaches the upper limit, while the piston 34 can be determined to be reached the upper limit position when the internal pressure reaches the lower limit.

Figure 4:
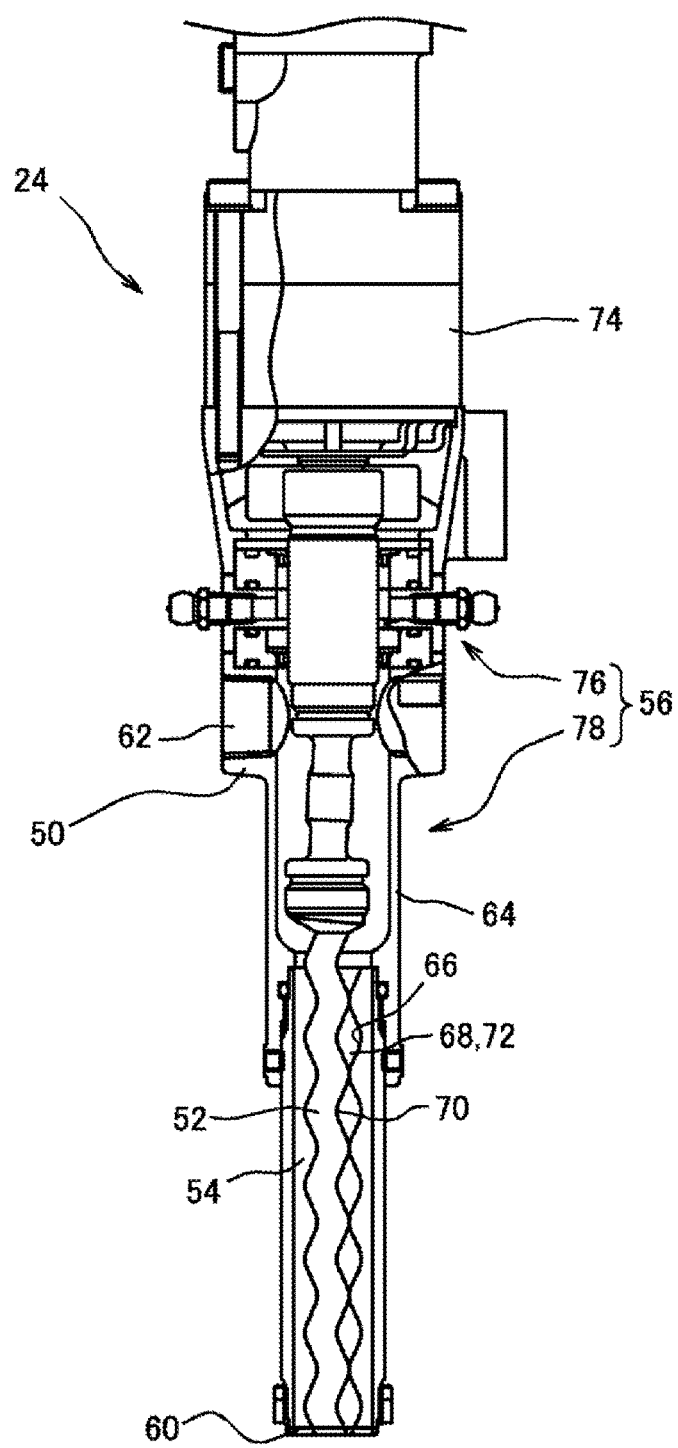
FIG. 4 is a cross-sectional view illustrating a structure of a discharge part adopted to the discharging device of FIG. 2A-FIG. 2D.

The discharge part 24 is comprised of a rotary displacement pump. In this embodiment, the discharge part 24 is comprised of a so-called uniaxial eccentric screw pump (refer to FIG. 4). The discharge part 24 is constructed by accommodating, for example, a rotor 52, a stator 54, and a power transmission mechanism 56 inside a casing 50. The casing 50 is a cylindrical member made of metal, and a first opening 60 is formed at one end side in longitudinal directions. A second opening 62 is formed in the circumference of the casing 50. The second opening 62 communicates with an interior space of the casing 50 at an intermediate part 64 located at an intermediate part of the casing 50 in the longitudinal directions.

The first opening 60 and the second opening 62 function as a suction port and a discharge port, respectively, of the uniaxial eccentric screw pump which forms the discharge part 24. As the discharge part 24 rotates the rotor 52 in a positive direction, the first opening 60 functions as the discharge port and the second opening 62 as the suction port. Contrarily, as the rotor 52 is rotated in the opposite direction for maintenance etc., the first opening 60 functions as the suction port and the second opening 62 as the discharge port, to allow the interior space etc. of the casing 50 to be cleaned.

The stator 54 is a member having the outer shape of a substantially circular cylinder made of an elastic material, such as rubber, or a resin. An inner circumference wall 66 of the stator 54 is formed in a single-twist or multiple-twist female screw shape with n-grooves. In this embodiment, the stator 54 is formed in a multiple twist female screw with two grooves. A penetration bore 68 of the stator 54 is formed in a substantially elongated circle or oval in the cross-sectional shape thereof (aperture shape) even if it is cut at any position in the longitudinal directions of the stator 54.

The rotor 52 is a shaft body made of metal, and is formed in a single-twist or multiple-twist male screw shape with n−1 grooves. In this embodiment, the rotor 52 is formed in an eccentric male screw with one groove. The rotor 52 is formed in a substantially true circle in the cross-sectional shape thereof even if it is cut at any position in the longitudinal directions. The rotor 52 is inserted into the penetration bore 68 formed in the stator 54 described above, and is freely eccentrically rotatable inside the penetration bore 68.

As the rotor 52 is inserted into the stator 54, an outer circumference wall 70 of the rotor 52 closely contacts the inner circumference wall 66 of the stator 54 at both the tangents, and thereby fluid carrying paths 72 (cavities) are formed between the inner circumference wall 66 of the stator 54 and the outer circumference wall 70 of the rotor 52. The fluid carrying paths 72 spirally extend in the longitudinal directions of the stator 54 and the rotor 52.

As the rotor 52 is rotated inside the penetration bore 68 of the stator 54, the fluid carrying paths 72 shift in the longitudinal direction of the stator 54 while rotating inside the stator 54. Therefore, when the rotor 52 is rotated, it is possible to suck the fluid into the fluid carrying paths 72 from one end side of the stator 54, and carry this fluid toward the other end side of the stator 54 in a state where the fluid is sealed inside the fluid carrying paths 72, and then discharge the fluid from the other end side of the stator 54.

The power transmission mechanism 56 is to transmit power from a drive 74 to the rotor 52 described above. The power transmission mechanism 56 includes a power transmission part 76 and an eccentric rotation part 78. The power transmission part 76 is provided at one end side in the longitudinal directions of the casing 50. The eccentric rotation part 78 is provided to the intermediate part 64. The eccentric rotation part 78 connects the power transmission part 76 with the rotor 52 so that a power transmission there-between is possible. The eccentric rotation part 78 includes a coupling shaft 98 comprised of a known coupling rod, a screw rod, etc. Thus, the eccentric rotation part 78 actuates the drive 74 to transmit the generated torque to the rotor 52, thereby eccentrically rotating the rotor 52.

As illustrated in FIGS. 2A-2D, the discharge-side detachable part 26 is connected to the casing 50 which forms the discharge part 24 described above. As illustrated in FIGS. 2C and 2D, the discharge-side detachable part 26 is constructed by attaching a discharge-side coupler 82 and pins 84 to a discharge-side detachable part main body 80. The discharge-side detachable part main body 80 is constructed by providing a rectangular connecting part 80b to a base end part of a circular cylindrical tube part 80a. A fitting part 80c into which the discharge-side coupler 82 is inserted is formed in a tip end side of the tube part 80a. A communicating path 80d is formed inside the tube part 80a so as to penetrate from the fitting part 80c to the connecting part 80b. The discharge-side detachable part main body 80 is attached to the casing 50 in a state where it is positioned so that the communicating path 80d communicates with the second opening 62 formed in the discharge part 24. A seal member 86, such as an O-ring, is attached to the circumference on the tip end side of the tube part 80a.

As will be described later in detail, the discharge-side coupler 82 constitutes the connecting device 140 for connecting the discharging device 20 to the refilling device 100 by a combination with a refill-side coupler 134 provided to the refilling device 100. The discharge-side coupler 82 is capable of accepting the refill-side coupler 134 at the time of the connection, and is a female plug having a structure described later in detail. The discharge-side coupler 82 is inserted into the fitting part 80c provided in the tube part 80a of the discharge-side detachable part main body 80, and communicates with the communicating path 80d.

The pins 84 constitute a disconnection preventive mechanism 150 by a combination with latch grooves 144 formed on the refilling device 100 side, as will be described later in detail. The pins 84 are used in order to align the discharging device 20 with the refilling device 100 when connecting the discharging device 20 to the refilling device 100, and prevent a disconnection of the discharging device 20 from the refilling device 100. The pins 84 are formed so as to project substantially perpendicular to the circumferential surface of the tube part 80a, at positions on the base end side of the tube part 80a (connecting part 80b side). Two pins 84 are provided to the tube part 80a, at an interval of substantially 180° in the circumferential direction.

As illustrated in FIG. 1, the discharging device 20 is attached to a manipulator 90 having a plurality of degrees of freedom, such as a so-called articulated robot. Thus, the fluid is discharged from the discharging device 20 while moving the discharging device 20 by the manipulator 90 to apply the fluid to various components according to a given fluid application pattern. Further, the discharging device 20 is moved by the manipulator 90, and the discharge-side coupler 82 is then brought close to the refill-side coupler 134 described later in detail to align the discharge-side coupler 82 with the refill-side coupler 134 to connect the discharging device 20 with the refilling device 100. The discharging device 20 can be disconnected from the refilling device 100 by performing a reverse operation.

Figure 2:
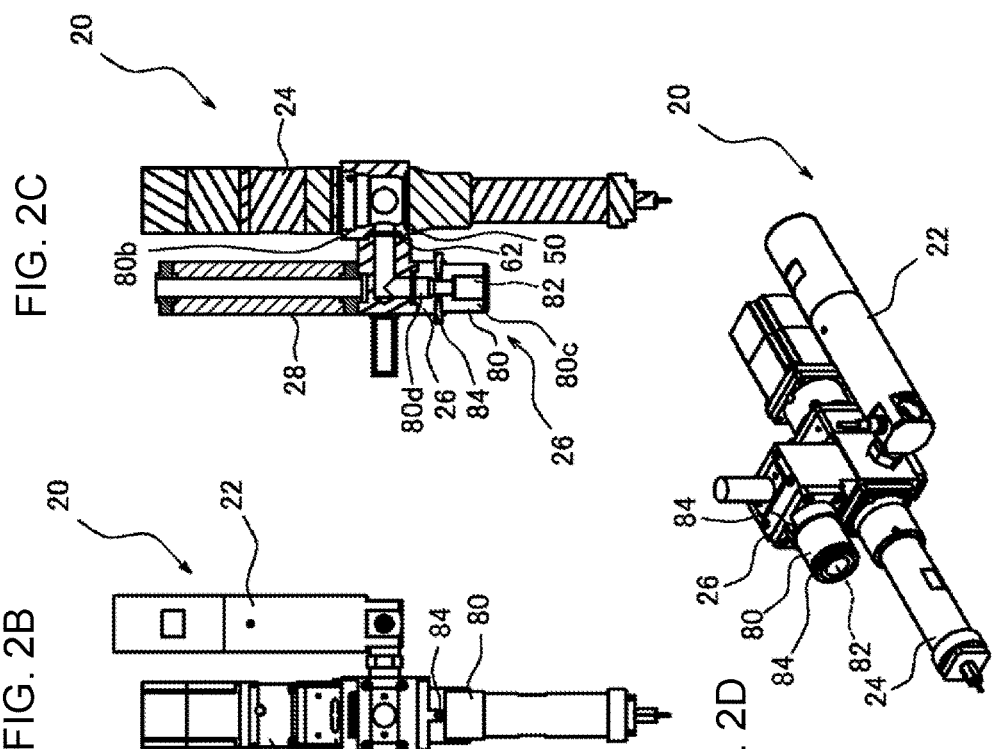
FIGS. 2A-2D are views illustrating a discharging device which is adopted to the discharge system of FIG. 1, where

Here, in the discharge system 10 of this embodiment, when refilling the discharging device 20 with the fluid, the discharge-side coupler 82 is desirable to be certainly fitted onto the refill-side coupler 134 without any complicated operations of the manipulator 90. In the discharge system 10 in terms of such a point of view, as illustrated in FIGS. 1 and 2, the discharge-side coupler 82 is attached so that the axial direction of the discharge-side coupler 82 (inflow and outflow directions of the fluid) is parallel to the axial direction of the discharge part 24 (substantially parallel in the illustrated state).

Further, as illustrated in FIG. 1, an arm of the manipulator 90 is connected via the bracket 28 to the discharge-side coupler 82 at a position along the axis of the discharge-side coupler 82. Thus, as illustrated in FIGS. 9A-9D, the discharge part 24 is oriented substantially vertical, and the discharging device 20 is then descended toward the refilling device 100. Accordingly, the discharge-side coupler 82 is fitted onto the refill-side coupler 134 without any complicated operations of the manipulator 90 to connect both of the couplers, and in this state, the refill operation of the fluid can be performed. Here, in order to smoothly connect the discharge-side coupler 82 to the refill-side coupler 134 without any axial offset between both of the couplers, it is desirable to have a distance D from the connecting point between the discharging device 20 and the manipulator 90 to a vertical line L which passes through the center of a pedestal 90a of the manipulator 90 as short as possible.

Figure 5:
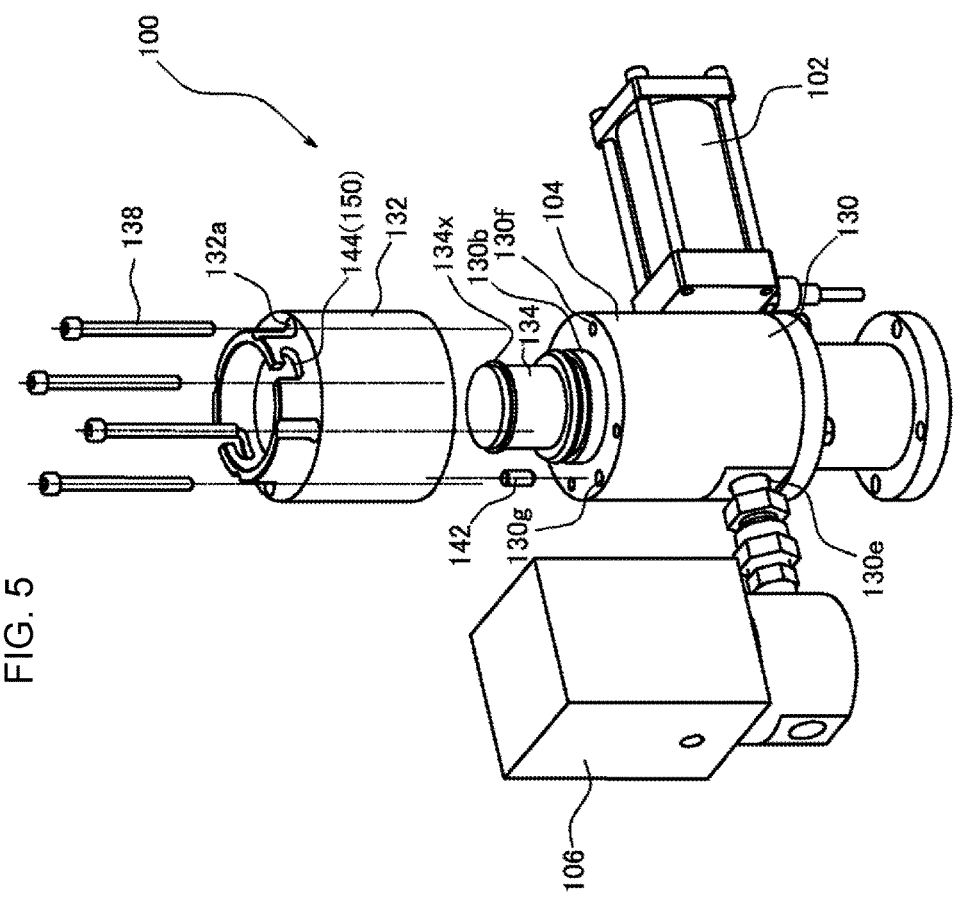
FIG. 5 is an exploded perspective view of a refilling device adopted to the discharge system of FIG. 1.
Figure 6B:
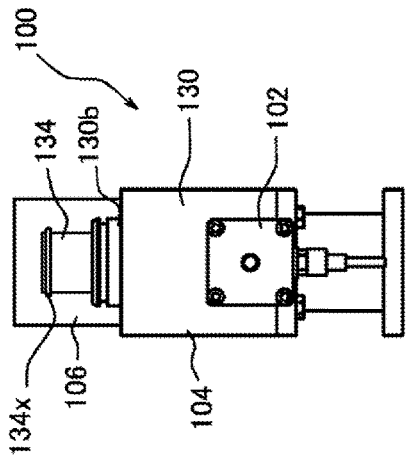
FIGS. 6A-6D are views illustrating a part other than a sealed space forming body of the refilling device of FIG. 5, where
Figure 6D:
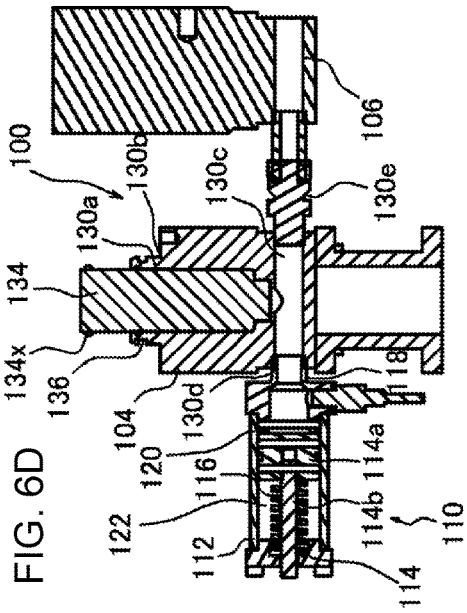
Figure 6A:
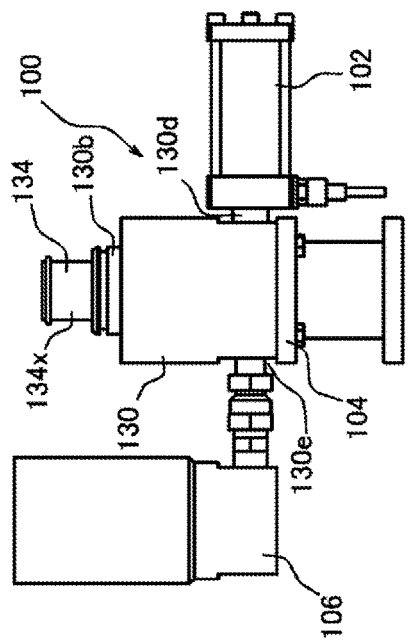
Figure 6C:
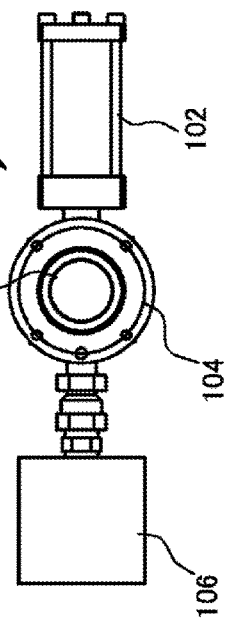

The refilling device 100 functions as a refill station for refilling the discharging device 20 with the fluid. As illustrated in FIGS. 1 and 5, the refilling device 100 includes a refill-side buffer part 102 (shock absorber), a refill-side detachable part 104, and a valve 106. The refill-side buffer part 102 is provided to buffer an internal pressure fluctuation of the refilling device 100 associated with a connection and disconnection of the discharging device 20 to/from the refilling device 100 when refilling the discharge part 24 with the fluid. Although the refill-side buffer part 102 may be comprised of a container, such as a tank, or the cylinder mechanism 30 similar to the discharge-side buffer part 22 described above, the refill-side buffer part 102 is comprised of an absorber mechanism 110 in this embodiment as illustrated in FIG. 6D.

Specifically, the absorber mechanism 110 includes a casing 112, a piston 114, and a spring 116, and is operated using an elastic force of the spring 116. The casing 112 is a circular cylindrical tube body and has a connecting part 118 on one end side in axial directions thereof. The piston 114 is freely slidable inside the casing 112 in the axial directions. The piston 114 is constructed by connecting a piston rod 114b to a piston body 114a. An interior space of the casing 112 is divided via the piston body 114a into a first chamber 120 on one side and a second chamber 122 which communicates with the connecting part 118 on the other side. The spring 116 is provided inside the second chamber 122. Thus, the piston body 114a is biased toward the first chamber 120. When the fluid inflows via the connecting part 118, the piston body 114a is pushed back toward the second chamber 122 against the biasing force of the spring 116, thereby expanding the first chamber 120.

As illustrated in FIG. 5, the refill-side detachable part 104 is constructed by integrally connecting a sealed space forming body 132 to a refill-side detachable part main body 130. As illustrated in FIG. 6D, the refill-side detachable part main body 130 has a hollow fitting part 130a, and is provided with a connecting part 130b formed so as to be continuous from the fitting part 130a and project on the top side. The refill-side coupler 134 described later in detail is integrally inserted into the fitting part 130a. A seal member 136, such as an O-ring is attached to the circumference of the connecting part 130b.

The refill-side detachable part main body 130 has a communicating path 130c formed so as to communicate with the fitting part 130a. Connection ports 130d and 130e are formed at both ends of the communicating path 130c. The connecting part 118 of the refill-side buffer part 102 is plumbed to the connection port 130d. The valve 106 is plumbed to the connection port 130e.

The refill-side coupler 134 constitutes the connecting device 140 for connecting the discharging device 20 to the refilling device 100 by a combination with the discharge-side coupler 82 provided on the discharging device 20 side. The refill-side coupler 134 is a male socket onto which the discharge-side coupler 82 is connected. Although a particular structure of the refill-side coupler 134 will be described later in detail, as the refill-side coupler 134, one provided therein with a valve mechanism (not illustrated), such as a stop valve mechanism, may be used, for example. The refill-side coupler 134 is integrally fitted into the fitting part 130a of the refill-side detachable part main body 130, thereby communicating with the communicating path 130c formed in the refill-side detachable part main body 130. A seal member 134x, such as an O-ring, is attached to the circumference on the tip end side of the refill-side coupler 134.

As illustrated in FIG. 5, the sealed space forming body 132 is a cylindrical member which is detachably connected to the top side of the refill-side detachable part main body 130 described above. Specifically, the sealed space forming body 132 becomes integral with the refill-side detachable part main body 130 by inserting bolts 138 into a plurality of bolt insertion holes 132a (four in this embodiment) formed in the circumferential direction so as to extend in the axial directions, and fastening the bolts 138 with the threaded holes 130f formed in the top of the refill-side detachable part main body 130. Upon the integration of the refill-side detachable part main body 130 and the sealed space forming body 132, a positioning pin 142 is attached to a pin hole (not illustrated) formed in the bottom of the sealed space forming body 132 (refill-side detachable part main body 130 side) and a pin hole 130g formed at the top side of the refill-side detachable part main body 130. Thus, the refill-side detachable part main body 130 is connected to the sealed space forming body 132 so that they have a certain spatially aligned relationship there-between in the circumferential direction. A gap between the refill-side detachable part main body 130 and the sealed space forming body 132 is sealed with the seal member 136 attached to the circumference of the connecting part 130b.

The latch grooves 144 are formed in a top part of the cylinder body (end part opposite from the refill-side detachable part main body 130) which forms the sealed space forming body 132. The latch grooves 144 constitute the disconnection preventive mechanism 150 by a combination with the pins 84 provided on the discharging device 20 side. The disconnection preventive mechanism 150 holds the discharging device 20 and the refilling device 100 with a force which acts when refilling the fluid from the refilling device 100 toward the discharging device 20, so that the discharging device 20 is not disconnected from the refilling device 100. Specifically, each latch groove 144 is a slit having a substantially L-shape in the front view, and has a slit portion which opens toward the top of the sealed space forming body 132, and another slit portion which continues from the first slit portion so as to extend in the circumferential direction of the sealed space forming body 132. Thus, in the state where the pins 84 provided to the discharge-side detachable part 26 of the discharging device 20 are aligned with the latch grooves 144, the discharge-side detachable part 26 is inserted into the sealed space forming body 132 and is rotated in the circumferential direction to engage the pins 84 with the latch grooves 144 so that the pins 84 are not disengaged from the latch grooves 144.

An exhaust port (not illustrated) is formed in the circumference of the sealed space forming body 132. The exhaust port is connected to the sealed space forming body 132 so as to communicate the inside of the sealed space forming body 132 with the outside. As illustrated in FIG. 1, the sealed space forming body 132 is connected via the exhaust port to a decompressor 148, such as a vacuum pump.

The fluid feeder 160 pumps up the fluid from a storage tub 162 where the fluid is stored, and feeds the fluid to the refilling device 100. The fluid feeder 160 is plumbed to the valve 106 provided to the refilling device 100. Thus, a control of supplying the fluid to the refilling device 100 is carried out by suitably opening and closing the valve 106.

The controller 170 performs an operational control of each component, such as the discharging device 20, the manipulator 90, the refilling device 100, and the fluid feeder 160, which constitute the discharge system 10. The controller 170 controls operations, such as a discharge operation of the fluid from the discharging device 20, an operation of the manipulator 90, and a refill operation of the fluid which is carried out primarily by the discharging device 20 and the refilling device 100.

[Operation of Discharge System 10]

Figure 7:
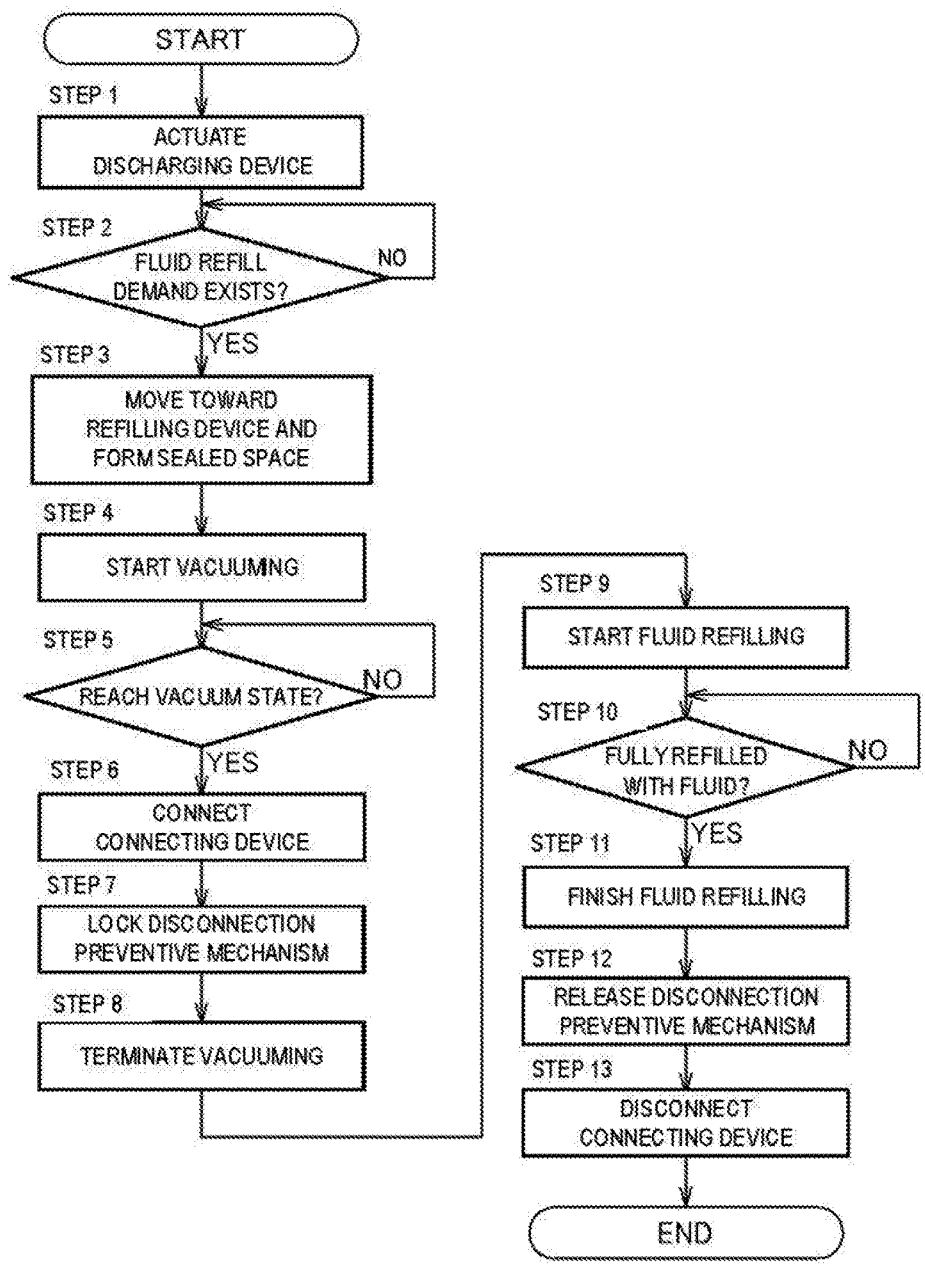
FIG. 7 is a flowchart illustrating an operation of the discharge system of FIG. 1.
Figure 8:
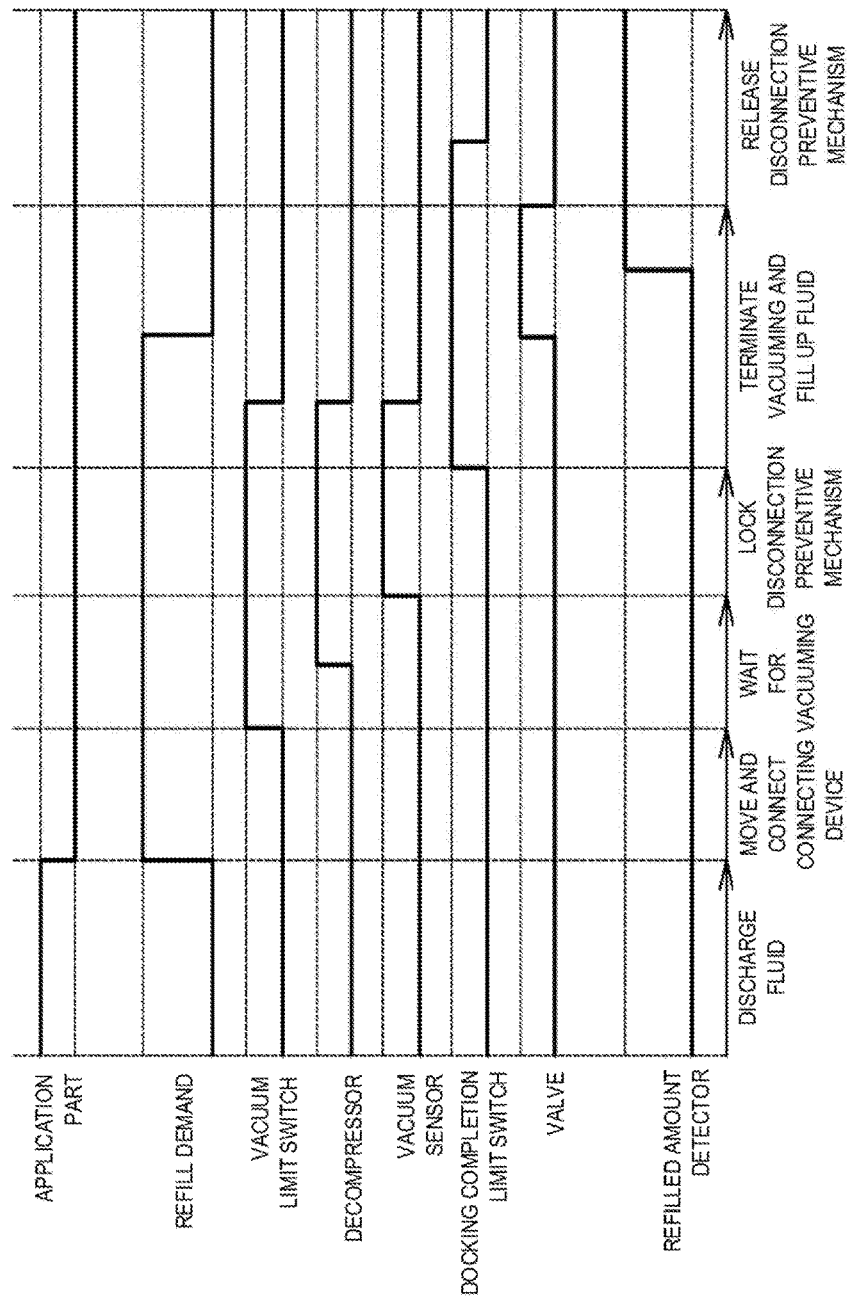
FIG. 8 is a timing chart illustrating the operation of the discharge system of FIG. 1.

Below, the operation of the discharge system 10 described above, particularly, the refill operation of the discharging device 20 with the fluid is primarily described referring to a flowchart illustrated in FIG. 7 and a timing chart illustrated in FIG. 8. In the discharge system 10, the discharging device 20 is actuated at Step 1, where the discharge operation of the fluid is carried out. After the operation of the discharging device 20, when the controller 170 determines at Step 2 that a demand of refilling the discharging device 20 with the fluid is outputted, the control flow transits to Step 3. Here, the determination of the existence of the demand of refilling the discharging device 20 with the fluid may be carried out based on various criteria. For example, when a pressure sensor (not illustrated) for detecting the internal pressure of the discharge-side buffer part 22 provided to the discharging device 20 detects a pressure below a given value, it may be determined that the piston 34 reaches the lower limit position inside the discharge-side buffer part 22, and the refill demand of the fluid is turned into an ON state. Alternatively, if the auto switch which turns on and off according to the position of the piston 34 is adopted as the refilled amount detector, it may be determined that the refill demand of the fluid is turned on when the piston 34 is determined to be reached the lower limit position based on the detection result of the auto switch.

Figure 9A:
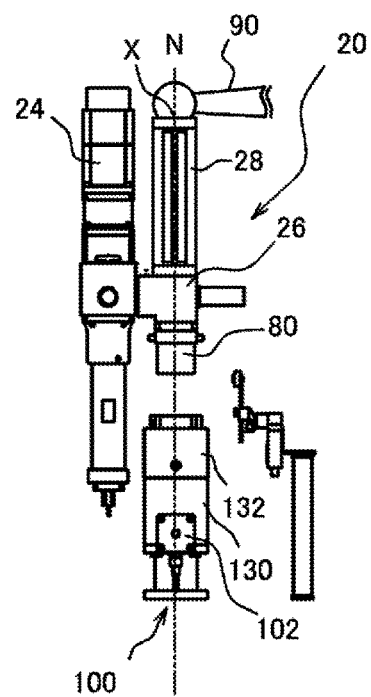
FIGS. 9A-9D are views illustrating the operation according to the discharge system of FIG. 1, where
Figure 9B:
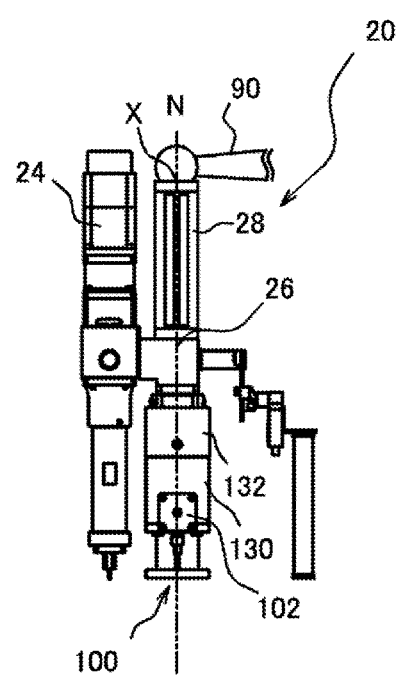
Figure 9C:
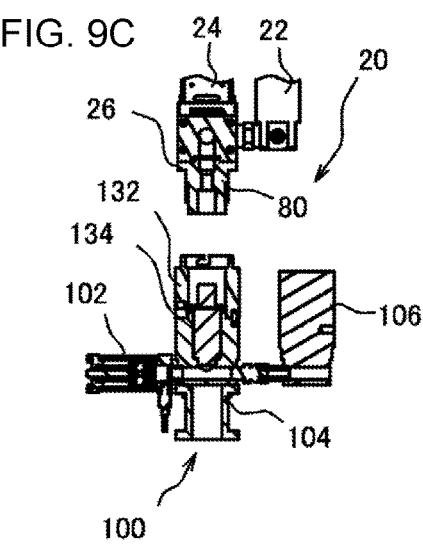

If it is determined that the fluid refill demand exists at Step 2 and the control flow transits to Step 3, the discharging device 20 is then moved toward the refilling device 100 by the manipulator 90 as illustrated in FIGS. 9A and 9C. Then, the tube part 80a of the discharge-side detachable part main body 80 provided on the discharging device 20 side is inserted from the top of the cylindrical sealed space forming body 132 provided on the refilling device 100 side. In this stage (Step 3), it is a state where the discharge-side coupler 82 on the discharging device 20 side is not connected to the refill-side coupler 134. In this state, the gap between the outer circumferential surface of the tube part 80a and the inner circumferential surface of the sealed space forming body 132 is sealed with the seal member 86 attached to the outer circumference of the tube part 80a, at the top side of the sealed space forming body 132. On the other hand, at the bottom side of the sealed space forming body 132, the gap between the outer circumferential surface of the connecting part 130b and the inner circumferential surface of the sealed space forming body 132 is sealed with the seal member 136 attached to the circumference of the connecting part 130b. Therefore, in the state of Step 3, a sealed space 135 is formed inside the sealed space forming body 132, and the discharge-side coupler 82 and the refill-side coupler 134 are disposed in a non-connected state within the sealed space 135.

When the sealed space 135 is formed inside the sealed space forming body 132 as described above, the control flow transits to Step 4. At Step 4, the decompressor 148 plumbed to a discharge port 146 of the sealed space forming body 132 is actuated to start vacuuming in order to make the sealed space 135 substantially vacuum. Note that a detection of the connected state between the tube part 80a and the sealed space forming body 132 which is a trigger of starting the vacuuming may be implemented in various methods. Specifically, a vacuum limit switch (not illustrated) for detecting that the tube part 80a is inserted into the sealed space forming body 132 may be provided at a position adjacent to the refilling device 100. Based on a signal outputted from the vacuum limit switch, the controller 170 may determine that the tube part 80a is inserted into the sealed space forming body 132, and the sealed space 135 is formed.

Figure 9D:
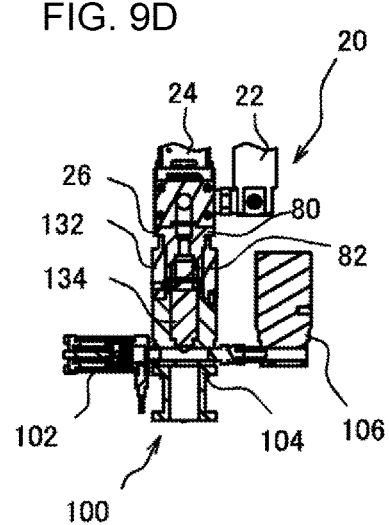

After the vacuuming is started at Step 4, when a vacuum sensor (not illustrated) for detecting a degree of vacuum of the sealed space 135 confirms at Step 5 that the degree of vacuum reaches a target value, the control flow transits to Step 6. At Step 6, the controller 170 controls the operation of the manipulator 90 so that the discharging device 20 moves in the axial direction of the discharge-side coupler 82 to approach the refilling device 100. Here, the controller 170 outputs to the manipulator 90 a signal which controls an operating speed of the discharging device 20 (operating speed control signal) so that the discharging device 20 approaches the refilling device 100 at a given speed V1. Thus, as illustrated in FIGS. 9B and 9D, within the sealed space 135, the discharge-side coupler 82 approaches the refill-side coupler 134 at the speed V1, and both of the couplers 82 and 134 (connecting device 140) become into a connecting state.

Figure 10A:
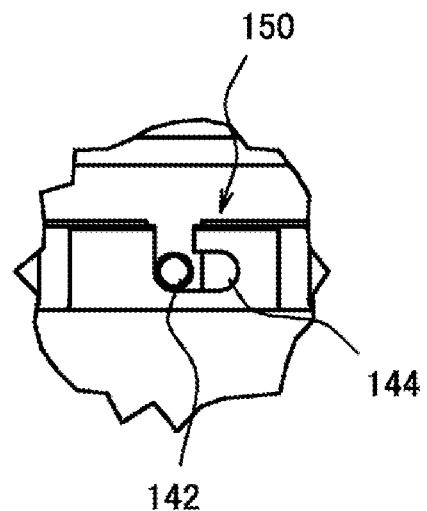
FIGS. 10A-10B are enlarged views of a disconnection preventive mechanism, sequentially illustrating an operating state of the mechanism.
Figure 10B:
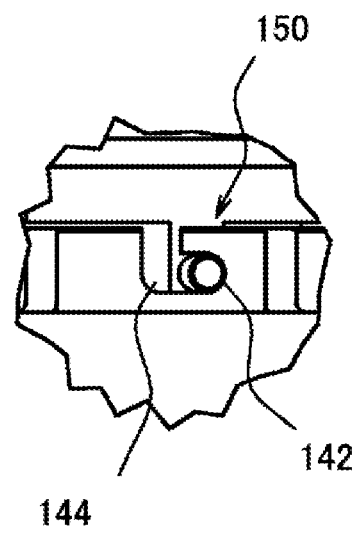

When the connecting device 140 becomes into the connecting state, the disconnection preventive mechanism 150 is locked at Step 7. Specifically, when the discharge-side coupler 82 is connected to the refill-side coupler 134 at Step 6, the pins 84 provided in the circumference of the discharge-side detachable part main body 80 also move in the axial direction of the sealed space forming body 132, and enter into the latch grooves 144 formed in the sealed space forming body 132, as illustrated in FIG. 10A. At Step 7, when the manipulator 90 turns the discharging device 20 in the circumferential direction of the sealed space forming body 132 as illustrated, the discharging device 20 is rotated, and the pins 84 moves along the latch grooves 144 and engage with the latch grooves 144 as illustrated in FIG. 10B. Thus, the disconnection preventive mechanism 150 is locked, and the discharging device 20 is connected with the refilling device 100. The detection of the pins 84 reached near the ends of the latch grooves 144 and the disconnection preventive mechanism 150 being locked may be carried out in various methods. Specifically, a docking completion limit switch (connected state detector: not illustrated) may be provided at a position adjacent to the refilling device 100, which detects that the discharging device 20 is rotated to the position where the pins 84 reaches near the end of the latch groove 144. Based on a signal outputted from the docking completion limit switch, it may be detected whether the discharging device 20 is connected to the refilling device 100 and the disconnection preventive mechanism 150 is locked.

When the connection of the connecting device 140 is finished as described above and the disconnection preventive mechanism 150 is locked, the decompressor 148 is stopped at Step 8 to terminate the vacuuming. Then, the control flow transits to Step 9, where the refill of the discharging device 20 with the fluid from the refilling device 100 is started. Specifically, at Step 9, the valve 106 provided to the refilling device 100 is opened, and the fluid pumped from the fluid feeder 160 is then fed to the discharging device 20 side via the connecting device 140 comprised of the discharge-side coupler 82 and the refill-side coupler 134. That is, in this embodiment, the valve 106 is opened based on one criterion in which the connection of the discharging device 20 to the refilling device is detected by the docking completion limit switch at Step 7 described above, and based on another criterion in which the vacuuming at Step 8 is finished. The fluid fed to the discharging device 20 side is refilled inside the casing 50 of the discharge part 24 via the discharge-side detachable part 26. Here, as described above, the discharge-side buffer part 22 and the refill-side buffer part 102 are provided to the discharging device 20 and the refilling device 100, respectively. Thus, the internal pressure fluctuation associated with the refilling of the discharging device 20 with the fluid from the refilling device 100 can be buffered, and the internal pressures of the discharging device 20 and the refilling device 100 are maintained at a low pressure near atmospheric pressure.

When the refill of the fluid is started as described above, the control flow transits to Step 10, and the controller 170 then determines whether the discharging device 20 side is filled up. Here, various methods for detecting the discharging device 20 being sufficiently or fully refilled with the fluid may be adopted. Specifically, the fluid being sufficiently or fully refilled and the refill demand being turned off may be determined based on a criterion in which the pressure sensor (not illustrated) for detecting the internal pressure of the discharge-side buffer part 22 of the discharging device 20 detects a pressure more than a given value. Further, if the auto switch which turns on and off according to the position of the piston 34 is adopted to the refilled amount detector, the fluid refill demand may be determined to be turned off when the piston 34 reaches the detection range of the auto switch provided at an upper limit position and the auto switch at the upper limit position is then turned on.

At Step 10, if it is confirmed that the fluid is filled up in the discharging device 20, the control flow transits to Step 11, where the valve 106 is closed. Thus, the refill of the discharging device 20 with the fluid from the refilling device 100 is finished. Thus, when the refill of the fluid is finished, the control flow transits to Step 12, where the disconnection preventive mechanism 150 is released. Specifically, the manipulator 90 is actuated to turn the discharging device 20 in the direction opposite from the case where the disconnection preventive mechanism 150 is locked at Step 7, and the discharging device 20 is disconnected or separated from the refilling device 100 in the axial direction. Thus, when the pins 84 are released from the latch grooves 144, the disconnection preventive mechanism 150 is unlocked.

When the unlocking of the disconnection preventive mechanism 150 is finished, the control flow then transits to Step 13. At Step 13, the discharging device 20 further moves in the direction separating from the refilling device 100 in the axial direction. Here, the controller 170 outputs to the manipulator 90 the signal (operating speed control signal) for controlling the operating speed so that the discharging device 20 separates from the refilling device 100 at a given speed V2. This disconnecting speed V2 is equal to or below the connecting speed V1 at Step 6 described above ($|V1| \geq |V2|$). Thus, the discharge-side coupler 82 separates from the refill-side coupler 134 at the speed V2 equal to or below the speed at the time of connecting operation, and the discharge-side coupler 82 escapes from the refill-side coupler 134 to be disconnected therefrom. Thereby, the sequence of operational flow is finished.

[Detailed Structure of Connecting Device 140]

The connecting device 140 is comprised of the combination of the discharge-side coupler 82 and the refill-side coupler 134 as described above. Below, structure of each of the discharge-side coupler 82 and the refill-side coupler 134, which form the connecting device 140, are described. Additionally, the size of a clearance formed there-between is also described.

Figure 11A:
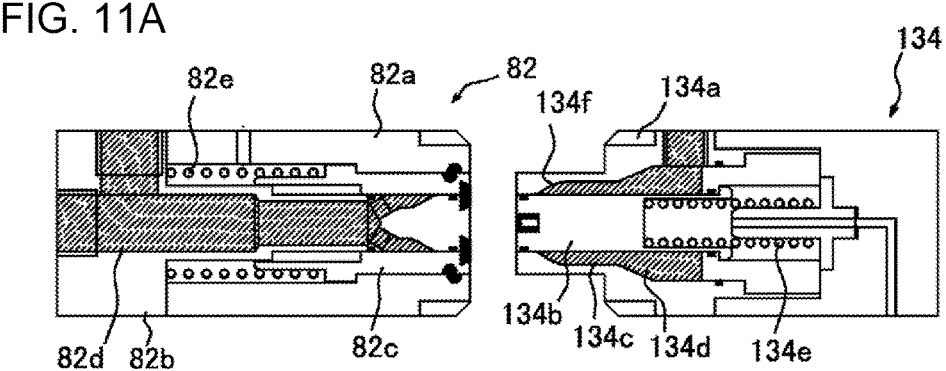
FIGS. 11A-11C are cross-sectional views of one example of a discharge-side coupler and a refill-side coupler, illustrating an operation of a connecting process.
Figure 11B:
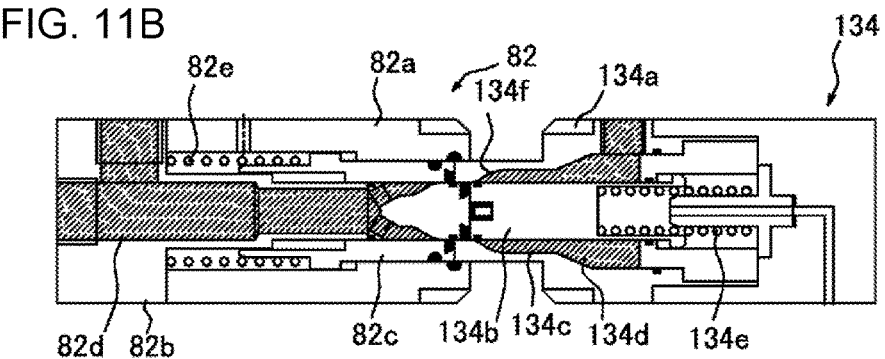
Figure 11C:
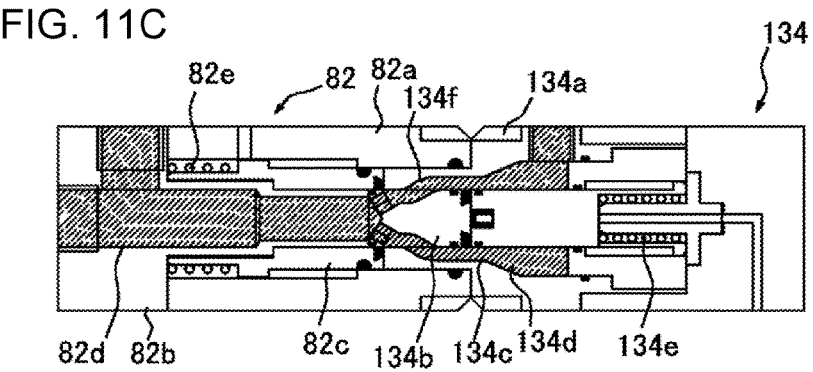

A socket as illustrated in FIGS. 11A-11C is adopted as the discharge-side coupler 82. More specifically, the discharge-side coupler 82 includes a cylinder part 82a, a channel forming part 82b, and a piston part 82c (operating part) which is slidable in the axial direction. The cylinder part 82a is a cylindrical member and has a diameter of an aperture into which an inserting part 134f of the refill-side coupler 134 described above can be inserted. The channel forming part 82b is arranged substantially coaxial with the cylinder part 82a. A channel 82d is formed inside the channel forming part 82b. A terminal part of the channel 82d has an opening in an external surface of the channel forming part 82b.

The piston part 82c is arranged substantially coaxial with the cylinder part 82a and the channel forming part 82b. The piston part 82c is slidable along the surface of the channel forming part 82b. The piston part 82c is biased by a spring 82e toward a tip end side in the axial direction of the cylinder part 82a and the channel forming part 82b. Thus, the opening at the terminal part of the channel 82d formed in the channel forming part 82b is normally closed by an inner circumferential surface of the piston part. On the other hand, when a pressing force acts to the piston part 82c in a direction opposite from the biasing direction of the spring 82e, the piston part 82c slides toward the base end side in the axial direction.

The discharge-side coupler 82 moves the piston part 82c to the base end side from the terminal opening of the channel 82d against the biasing force of the spring 82e to open the channel 82d. When the piston part 82c moves to the tip end side by the biasing force, the channel 82d is closed. The piston part 82c operates at locations separated from the channel 82d rather than operates inside the channel 82d. Thus, even when the piston part 82c slides in the axial direction to open and close the channel 82d, the capacity of the channel 82d does not change.

As illustrated in FIGS. 11A-11C, the refill-side coupler 134 has a piston part 134b (operating part) which is slidable in the axial direction inside a cylinder part 134a. The cylinder part 134a is formed so as to be convex in cross section toward a tip end side in the axial direction, and has an inserting part 134f at the tip end side thereof. A recess 134d, which constitutes a channel 134c between an inner circumferential side of the cylinder part 134a and an outer circumferential surface of the piston part 134b, is formed in the inner circumferential side of the cylinder part 134a. The channel 134c communicates with the communicating path 80d. The piston part 134b is biased by a spring 134e toward the tip end side in the axial direction of the cylinder part 134a. When a pressing force acts on the piston part 134b in a direction opposite from the biasing direction of the spring 134e, the piston part 134b slides toward a base end side in the axial direction to open and close the channel 134c. The piston part 134b operates at locations separated from the channel 134c rather than operates inside the channel 134c. Thus, even when the piston part 134b slides in the axial direction to open and close the channel 134c, the capacity of the channel 134c does not change.

As the discharge-side coupler 82 is connected to the refill-side coupler 134, the channels 82d and 134c communicate with each other. Specifically, when connecting the discharge-side coupler 82 to the refill-side coupler 134, the inserting part 134f of the refill-side coupler 134 is received by the cylinder part 82a of the discharge-side coupler 82. That is, the cylinder part 82a of the discharge-side coupler 82 functions as a receptor for receiving the inserting part 134f of the refill-side coupler 134. As illustrated in FIG. 11B, when connecting the discharge-side coupler 82 to the refill-side coupler 134, the piston part 82c on the discharge-side coupler 82 side is pushed in by the inserting part 134f. Accordingly, the piston part 82c slides in a direction opposite from the biasing direction of the spring 82e. On the other hand, the piston part 134b provided to the refill-side coupler 134 side is pressed in the axial direction by the tip end part of the channel forming part 82b on the discharge-side coupler 82 side. Thus, the piston part 134b slides in a direction opposite from the biasing direction of the spring 134e.

When the operation of inserting the inserting part 134f of the refill-side coupler 134 into the cylinder part 82a of the discharge-side coupler 82 as described above is continued, the terminal openings of the channels 82d and 134c which are closed by the piston parts 82c and 134b are opened so that the channels 82d and 134c communicate with each other, as illustrated in FIG. 11C. Thus, although the piston parts 82c and 134b operate during the process where the discharge-side coupler 82 is connected to the refill-side coupler 134, the capacities of the channels 82d and 134c do not fluctuate. Also when the discharge-side coupler 82 is separated (disconnected) from the refill-side coupler 134, the capacities of the channels 82d and 134c do not fluctuate either, because only an operation reversed from the operation described above is performed. Thus, even when the discharge-side coupler 82 is connected and separated to/from the refill-side coupler 134, the fluid pressure fluctuation associated with the capacity fluctuation etc. of the channels 82d and 134c does not occur. Therefore, disadvantages, such as the fluid becomes at a high pressure and leaks when connecting and disconnecting the discharge-side coupler 82 to/from the refill-side coupler 134, and the fluid becomes at a negative pressure to generate air bubbles, can be prevented.

Next, the clearance between the discharge-side coupler 82 and the refill-side coupler 134 is described. The clearance between the discharge-side coupler 82 and the refill-side coupler 134 is desirable to be determined so that wear of both of the couplers are minimized. Further, it is desirable to optimize the clearance according to the characteristics of the fluid which is handled in the discharge system 10.

Figure 13A:
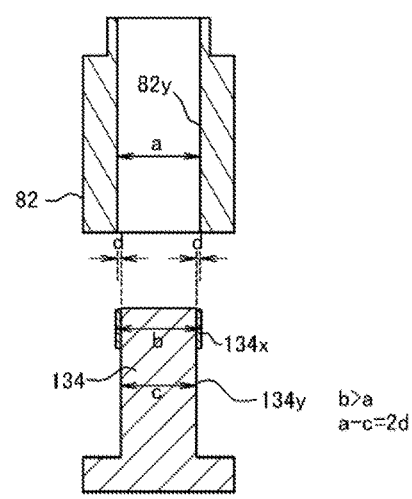
FIG. 13A is a diagram illustrating a relation of a size of a clearance between the discharge-side coupler and the refill-side coupler.

Specifically, as illustrated in FIG. 13A, assuming that an inner diameter of the discharge-side coupler 82 is "a," an outer diameter of a seal member 134x, such as an O-ring, attached to a tip end part of the refill-side coupler 134 is "b," an outer diameter of the refill-side coupler 134 is "c," and the clearance formed between the discharge-side coupler 82 and the refill-side coupler 134 is "d," relations of $c<a$ and $(a-c)=2d$ are satisfied. Further, a relation of $b>a$ needs to be satisfied in order for the seal member 134x normally demonstrating a sealing performance. In order to reduce the wear of the discharge-side coupler 82 and the refill-side coupler 134, the clearance "d" needs to be at least a positive value $(d>0)$.

Here, if the fluid handled in the discharge system 10 contains particulate matters, the particulate matters may be caught in the clearance. Thus, when matters larger than the clearance "d" are contained in the particulate matters, the wear of the discharge-side coupler 82 and the refill-side coupler 134 may easily be caused.

In order to solve the concern described above, it is desirable to adjust the clearance "d" based on a particle size distribution of the particulate matters. Specifically, the wear of the discharge-side coupler 82 and the refill-side coupler 134 can be reduced by having the clearance "d" equal to or greater than a median C (refer to FIG. 13B).

Figure 13B:
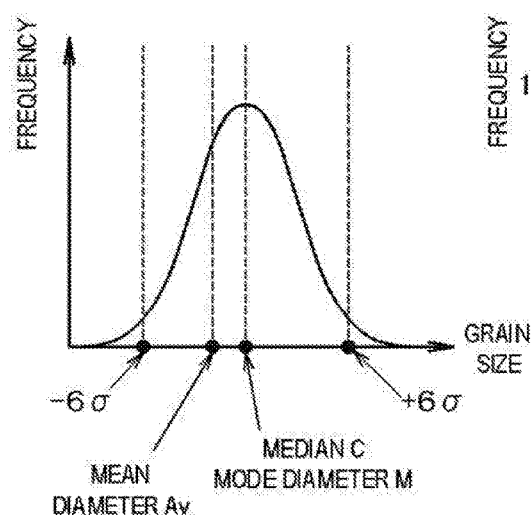
FIG. 13B is a diagram illustrating one example of a particle size distribution (frequency distribution) of particulate matters contained in fluid.
Figure 13C:
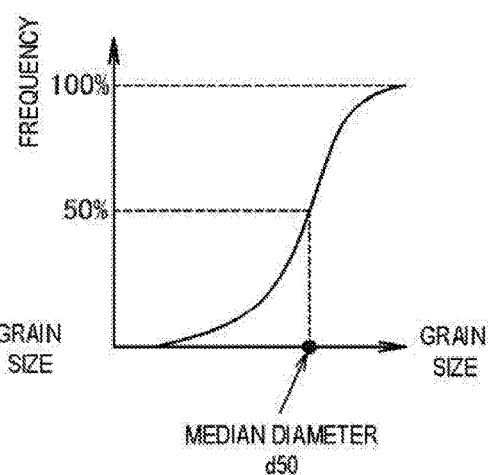
FIG. 13C is a diagram illustrating one example of a particle size distribution (cumulative distribution) of the particulate matters contained in the fluid.
Figure 14A:
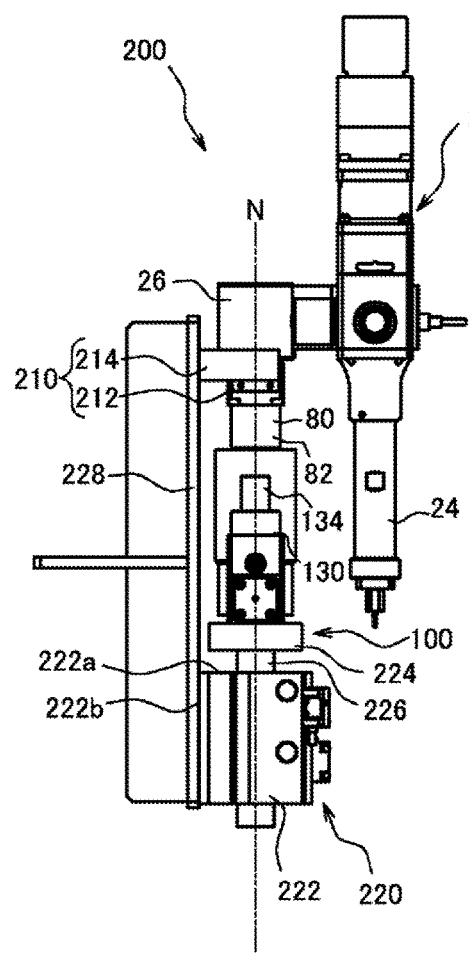
FIG. 14A is a side view illustrating a discharge system according to a modification.
Figure 14B:
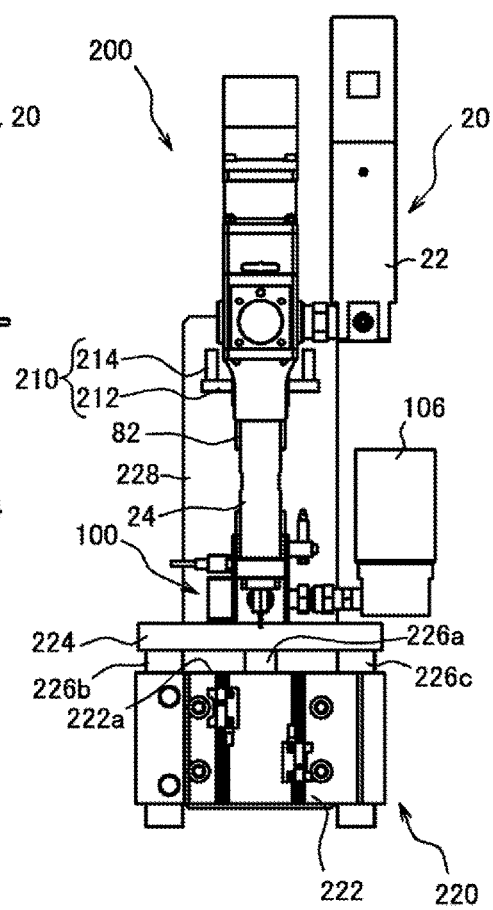
FIG. 14B is a front view of FIG. 14A.

Alternatively, as an index for adjusting the clearance "d" based on the particle size distribution of the particulate matters, a mode diameter M illustrated in FIG. 13B, a median diameter d50, or a mean (average) diameter Av illustrated in FIG. 13C may be adopted instead of the median C described above, and the clearance "d" may be set to a value equal to or greater than the index value (diameter). Alternatively, as the index for adjusting the clearance "d" based on the particle size distribution of the particulate matters, the largest value among the median C, the mode diameter M, the median diameter d50, and the mean diameter Av may be adopted, and the clearance "d" may be set to a value equal to or greater than the index value (diameter). Thus, the particle size distribution is comprehensively evaluated in terms of the median C, the mode diameter M, the median diameter d50, and the mean diameter Av, and the optimization of the clearance "d" is achieved. Therefore, it is certainly possible to further reduce the wear of the discharge-side coupler 82 and the refill-side coupler 134.

Assuming that a standard deviation of the particle size distribution of the fluid is σ, the clearance "d" may also be set to n·σ or greater that corresponds to a given multiple of the standard deviation G. Specifically, the wear described above can be eliminated by having the clearance "d" equal to or greater than the grain size corresponding to +6σ. The particle size distribution of the fluid hardly becomes a normal distribution. Thus, the median C is compared with the grain size corresponding to n·σ, and the clearance "d" is set equal to or greater than the grain size of the larger one, to more certainly reduce the wear described above.

As an approach for reducing the wear of the discharge-side coupler 82 and the refill-side coupler 134, it is desirable to have the hardness at the surface(s) of either one or both of the discharge-side coupler 82 and the refill-side coupler 134, particularly a portion that slides upon the connection and disconnection (corresponding to sliding parts 82y and 134y of the illustrated example), greater than the hardness of the particulate matters. Further, the wear described above can be prevented more certainly by determining the clearance "d" considering the particle size distribution of the particulate matters and determining the hardness of the sliding parts 82y and 134y considering the hardness of the particulate matters. In this embodiment, the hardness of the sliding parts 82y and 134y is equal to or greater than the hardness of the particulate matters.

As described above, in the discharge system 10 of this embodiment, the clearance "d" formed when connecting the discharge-side coupler 82 and the discharge-side coupler 82 is determined considering the particle size distribution of the particulate matters that constitute the fluid. Specifically, it is determined considering the median C, the mode diameter M, the median diameter d50, the mean diameter Av, or the n·σ value corresponding to a given multiple of the standard deviation σ, of the particle size distribution. Thus, according to the discharge system 10 described above, even when the fluid which contains the particulate matters is handled, the wear of the discharge-side coupler 82 and the discharge-side coupler 82 which is caused under the influence of the particulate matters, can be minimized.

As described above, in the discharge system 10 of this embodiment, the discharge-side coupler 82 is connectable to the refill-side coupler 134 by relatively moving the discharge-side coupler 82 in an axial line N direction of the refill-side coupler 134. Thus, the discharge system 10 is structured so that a coupling position X of the manipulator 90 and the discharging device 20 comes to a position on the axial line N when connecting the discharge-side coupler 82 to the refill-side coupler 134. Therefore, by moving the manipulator 90 substantially straight (moving in up-and-down directions in this embodiment), the coupling position X that is a point of action of an external force that acts when both the couplers are connected or disconnected, can be moved (descended) while being substantially aligned with the axial line N. That is, the discharge-side coupler 82 can be connected to the refill-side coupler 134 by having the external force act in the axial line N direction on the axial line N of the refill-side coupler 134 by actuating the manipulator 90, and relatively moving the discharge-side coupler 82 and the refill-side coupler 134 along the axial line N. Therefore, both of the couplers 82 and 134 can be connected and disconnected without causing wear when connecting and disconnecting the couplers 82 and 134.

As described above, in the discharge system 10 of this embodiment, the clearance "d" that is formed when the discharge-side coupler 82 is connected to the refill-side coupler 134 is determined considering the particle size distribution of the particulate matters that constitute the fluid. Specifically, the clearance "d" may be determined base on the median C, the mode diameter M, the median diameter d50, and the mean diameter Av of the particle size distribution, or a n·σ value that corresponds to a given multiple of the standard deviation G. Thus, according to the discharge system 10 described above, even when the fluid which contains the particulate matters is handled, the wear of the discharge-side coupler 82 and the refill-side coupler 134 which is caused under the influence of the particulate matters, can be minimized.

By using the largest one among the median C, the mode diameter M, the median diameter d50, and the mean diameter Av of the particle size distribution as a reference value as described above, the clearance "d" is determined to be equal to or greater than the reference value. Thus, the particle size distribution is comprehensively evaluated from various viewpoints, and the clearance is optimized. Similarly, also by setting the clearance "d" to the size equal to or greater than the grain size of the larger one among the median C and the n·σ value of the particle size distribution, the particle size distribution can be variously evaluated, and the clearance can be optimized.

As described above, in the discharge system of this embodiment, the refill-side coupler 134 on the refilling device 100 is formed as an inserting side (male) and the discharge-side coupler 82 on the discharging device 20 as an inserted or receiving side (female). Thus, the adhered amount of the fluid to the discharge-side coupler 82 during the refilling operation of the fluid to the discharging device 20 is minimized. Therefore, disadvantages, such as the fluid adhered to the discharge-side coupler 82 is, for example, unexpectedly fallen onto or adhered to a workpiece to which the fluid is discharged, can be reduced.

Further, as described above, since the seal member 134x is provided to the outer circumference of the refill-side coupler 134, an effect of scrapping the fluid adhered to the inner circumference of the discharge-side coupler 82 off by the seal member 134x can be expected when the discharging device 20 is disconnected or separated from the refilling device 100 after the fluid is refilled from the refilling device 100 to the discharging device 20. Therefore, the amount of the fluid adhered to the discharge-side coupler 82 can further be reduced after the discharging device 20 is refilled with the fluid.

Further, the discharge system 10 of this embodiment is structured so that the cylinder parts 82a and 134a operate at the locations separated from the channels 82d and 134d through which the fluid passes inside the discharge-side coupler 82 and the refill-side coupler 134, respectively. Thus, even when the discharge-side coupler is connected and disconnected to/from the refill-side coupler 134, the capacity fluctuation of the channels 82d and 134d through which the fluid passes can be reduced. Therefore, the leaks of the fluid can further be reduced when connecting and disconnecting the discharge-side coupler 82 to/from the refill-side coupler 134.

As described above, in the discharge system 10 of this embodiment, the control that opens the valve 106 (supply control of the fluid) is performed so that the supply of the fluid from the fluid feeder 160 is permitted when the connection state detector detects a connection between the discharging device 20 and the refilling device 100. Thus, a leak of the fluid which is caused under the influence of the pressure acting from the fluid feeder 160 side when connecting the discharging device 20 to the refilling device 100 can be reduced.

Further, in the above embodiment, the refilling device 100 includes the refill-side detachable part 104 and the valve 106, the refill-side detachable part 104 has the communicating path 130c that communicates with the refill-side coupler 134, and the valve 106 is connected to the communicating path 130c. Thus, the refill side connecting part 104 can be avoided from being high in pressure by carrying out the opening and closing control of the valve 106. Note that although in this embodiment, one example in which the refilling device 100 has the valve 106 built therein is illustrated, the present invention is not limited to this structure but the valve 106 may be disposed at a position upstream of the refill-side coupler 134 in the fluid flow direction, such as at an intermediate position of piping which connects the refilling device 100 to the fluid feeder 160.

In the discharge system 10 described above, the valve 106 is closed so that the supply of the fluid from the fluid feeder 160 is prevented when the refilled amount in the discharging device 20 reaching more than a given amount is detected. Thus, an unexpected fluid leak can be prevented also when separating the discharging device 20 from the refilling device 100 after the discharging device 20 is refilled with the fluid.

As described above, in the discharge system 10 of this embodiment, the connecting operation in which the discharge-side coupler 82 on the discharging device 20 side is connected to the refill-side coupler 134 on the refilling device 100 side in order to refill the fluid is carried out inside the sealed space 135 decompressed to a negative pressure by the decompressor 148. Thus, a possibility that air enters into the discharging device 20 and the refilling device 100 in association with the connecting operation can be reduced. Therefore, according to the discharge system 10, a poor discharge of the fluid associated with aeration can be minimized. Note that although the discharge system 10 of this embodiment illustrates one example in which the sealed space 135 can be decompressed to the negative pressure by the decompressor 148, the present invention is not limited to this structure. That is, if the poor discharge etc. of the fluid associated with the aeration does not need to be taken into consideration, the structures, such as the sealed space forming body 132 that constitutes the sealed space 150 and the decompressor 148, can be omitted. In this case, the criterion related to the completion of vacuuming (Step 8) is omitted from the criterion in which the valve 106 is opened to start the feeding of the fluid at Step 9 described above, and the valve 106 may be opened when the criterion in which the connection of the discharging device 20 to the refilling device is detected (Step 7) is satisfied.

In the discharge system 10 of this embodiment described above, the discharging device 20 and the refilling device 100 are provided with the discharge-side buffer part 22 and the refill-side buffer part 102, as the shock absorbers that buffer the variation of the internal pressure associated with the connection and disconnection of the discharging device 20 to/from the refilling device 100, respectively. Thus, when connecting and disconnecting the discharging device 20 to/from the refilling device 100, the insides of the discharging device 20 and the refilling device 100 being at the negative pressure can be reduced, and the poor discharge of the fluid associated with the air entry into both the devices 20 and 100 can be reduced more certainly.

In the discharge system 10, the discharge-side buffer part 22 provided with the cylinder mechanism is provided as the shock absorber on the discharging device 20 side. In the discharge-side buffer part 22, the piston 34 ascends as the fluid flows into the second chamber 44 during the refilling operation, thereby expanding the capacity of the second chamber 44. By operating the discharge-side buffer part 22 in this way, it can avoid that the inside of discharging device 20 becomes at the negative pressure, and the air entry into the discharging device 20 can be reduced. Thus, the poor discharge of the fluid can be reduced more certainly.

In the discharge system 10 of this embodiment, the refill-side buffer part 102 provided with the absorber mechanism that operates using the biasing force of the spring 116 is provided as the shock absorber on the refilling device 100 side. Thus, it is possible to reduce the inside of the refilling device 100 being at the negative pressure, and the air entry into the refilling device 100 can be reduced, which are associated with the connection and disconnection of the discharging device 20 to/from the refilling device 100.

In this embodiment, although one example in which the shock absorber provided with the cylinder mechanism is adopted as the discharge-side buffer part 22 on the discharging device 20 side, and the shock absorber provided with the absorber mechanism is provided as the refill-side buffer part 102 on the refilling device 100 side, is illustrated, the present invention is not limited to this structure. Specifically, as the shock absorber provided on the discharging device 20 side, one corresponding to the refill-side buffer part 102 provided with the absorber mechanism may be provided. Similarly, as the shock absorber provided on the refilling device 100 side, one corresponding to the discharge-side buffer part 22 provided with the cylinder mechanism may be provided.

In this embodiment, although one example in which one shock absorber which forms the discharge-side buffer part 22, and one shock absorber which forms the refill-side buffer part 102 are respectively provided to the discharging device 20 and the refilling device 100, is illustrated, the present invention is not limited to this structure. Specifically, the discharging device 20 may be comprised of two or more shock absorbers which form the discharge-side buffer part 22.

Although in this embodiment, as one example of the shock absorbers provided to the discharging device 20 and the refilling device 100, the discharge-side buffer part 22 provided with the cylinder mechanism and the discharge-side buffer part 22 provided with the absorber mechanism is illustrated, the present invention is not limited to this structure but the shock absorber may be comprised of an accumulator of other types, or a tank where the fluid inflows and outflows. Such a structure also reduces that the inside of the discharging device 20 or the refilling device 100 becomes at the negative pressure associated with the connecting and disconnecting operations, and can avoid the poor discharge of the fluid associated with the aeration.

Note that although in this embodiment, the structure provided with the discharge-side buffer part 22 and the refill-side buffer part 102 is illustrated, the present invention is not limited to this structure. That is, if the air entry associated with the connection and disconnection of the discharging device 20 to/from the refilling device 100 does not need to be taken into consideration, it is possible to omit either one or both of the discharge-side buffer part 22 and the refill-side buffer part 102.

The discharge system 10 of this embodiment includes the disconnection preventive mechanism 150 comprised of the positioning pin 142 and the latch grooves 144. Thus, in the state where the discharging device 20 is connected to the refilling device 100 for refilling of the fluid, the disconnection of the discharging device 20 from the refilling device 100 can certainly be prevented. Note that the disconnection preventive mechanism 150 illustrated in this embodiment is merely one example, and it is also possible to use a catch lock including a known ball catch lock, a hook, a fastener, etc. as the disconnection preventive mechanism 150. Alternatively, if the problem of the discharging device 20 disconnecting from the refilling device 100 does not occur when refilling the discharging device 20 with the fluid, it is not necessary to provide the disconnection preventive mechanism 150.

The discharge system 10 described above adopts the uniaxial eccentric screw pump as the discharge part 24 of the discharging device 20. Thus, it can discharge the fluid quantitatively and stably, without causing the fluctuation etc. of the fluid which is refilled to the discharging device 20 from the refilling device 100. In the discharge system 10, the poor discharge of the fluid associated with the aeration hardly occurs. Therefore, the discharge system 10 is very high in the discharge performance of the fluid, and can be suitably used in an application of, for example, applying fluid, such as sealing agent or adhesive, to various components at an automobile assembly plant etc.

In the discharge system 10 of this embodiment, the bolts 138 are removed on the refilling device 100 side to remove the sealed space forming body 132 from the refill-side detachable part main body 130, and maintenance, such as cleaning, of the refill-side coupler 134 is then carried out. Note that although one example in which the sealed space forming body 132 is attachable and detachable is illustrated in this embodiment, the present invention is not limited to this structure but the refill-side detaching part main body 130 and the sealed space forming body 132 may be integrally formed.

Note that in the discharge system 10 of this embodiment, when connecting and disconnecting the discharging device 20 to/from the refilling device 100 for refilling of the fluid, if the operating speed at the time of disconnection is a higher than the operating speed at the time of connection, the fluid is adhered to the connecting device 140 without the adhered fluid being scraped and, thus, the fluid leaks outside. Therefore, one example in which the separating speed V2 of the discharging device 20 from the refilling device 100 is controlled so as to be equal to or below the connecting speed V1 ($|V1| \geq |V2|$) based on the knowledge described above, is illustrated. However, it is not necessary to perform this control. That is, if the leak of the fluid outside the connecting device 140 does not need to be taken into consideration, or if other measures to the leak of the fluid are taken, the separating speed V2 of the discharging device 20 from the refilling device 100 may be higher than the connecting speed V1, for example.

[Modification of Connected State Detector and Modification of Operation of Discharge System 10]

In this embodiment, although one example in which the connection between the discharging device 20 and the refilling device 100 is detected with the docking completion limit switch, and the fluid is refilled to the discharging device 20 side from the refilling device 100 side when the connection between the discharging device 20 and the refilling device 100 is detected, is illustrated, the present invention is not limited to this structure. Specifically, the above embodiment illustrates the structure provided with the disconnection preventive mechanism 150. Thus, in the above embodiment, the criteria of starting the refill of the discharging device 20 with the fluid are, in addition to a connection between the discharge-side coupler 82 and the refill-side coupler 134, a spatial relationship so that the discharging device 20 and the refilling device 100 are locked by the disconnection preventive mechanism 150. However, if the problem, such as the fluid leak, does not occur even when the fluid refill is started before the lock by the disconnection preventive mechanism 150 is finished, or if the disconnection preventive mechanism 150 is not provided, the fluid refill may be started at the timing when the discharge-side coupler 82 is connected to the refill-side coupler 134. Therefore, if the lock by the disconnection preventive mechanism 150 is not essential for the trigger of the fluid refill start, or if the disconnection preventive mechanism 150 is not provided, the connected state detector for detecting the connection of the discharge-side coupler 82 to the refill-side coupler 134 may be provided instead of the docking completion limit switch, and the detection of the connection may be used as the criterion of the refill start. Alternatively, instead of the docking completion limit switch, a position of the manipulator 90 (moving coordinates) may be detected, and the connection of the discharge-side coupler 82 to the refill-side coupler 134 may be detected by using the detected position (moving coordinates) as an index.

Figure 12:
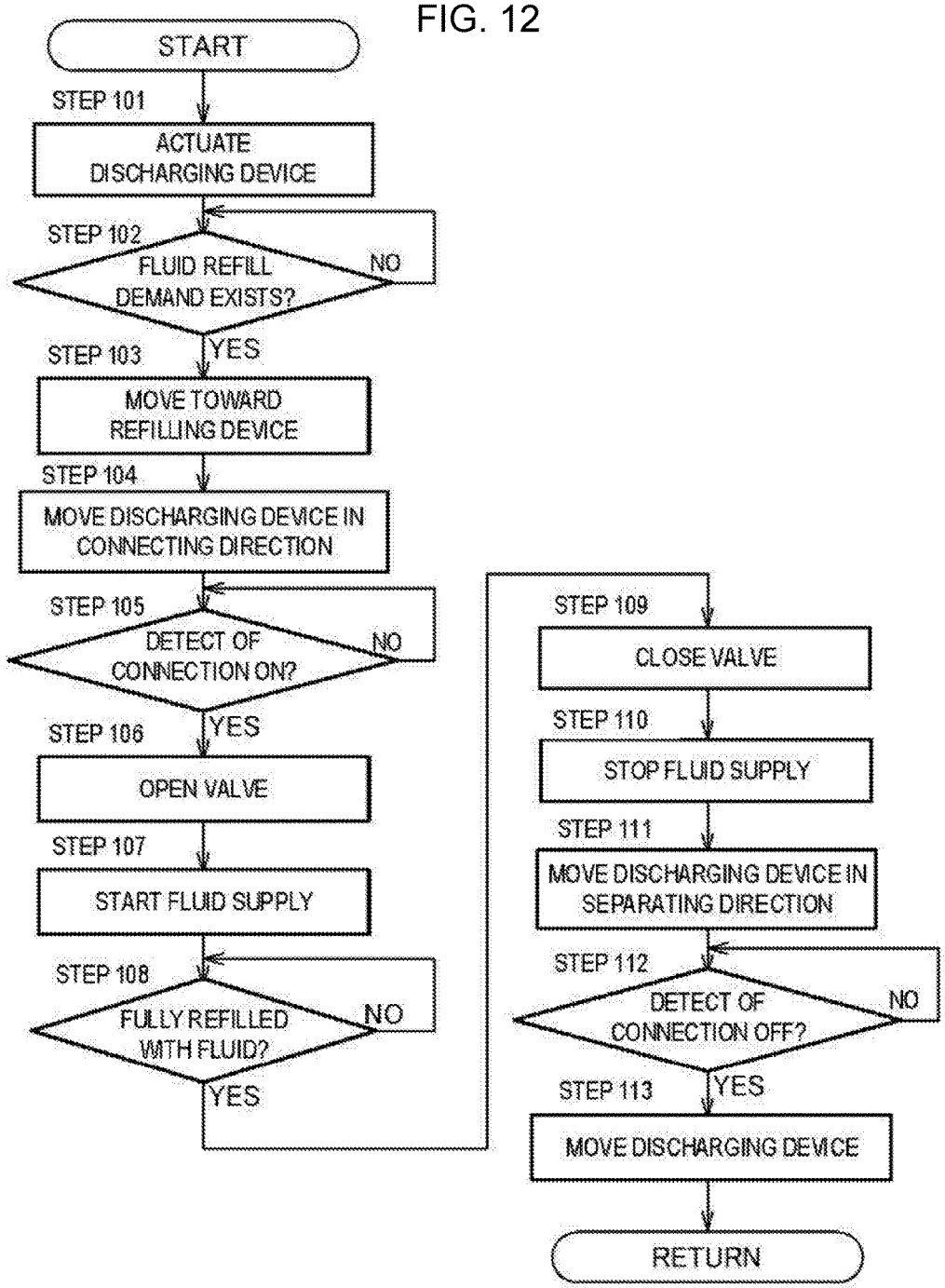
FIG. 12 is a flowchart illustrating a modification of the operation of the discharge system.

Specifically, if the disconnection preventive mechanism 150 is not provided, the operation may be controlled by the controller 170 like the flowchart illustrated in FIG. 12. That is, at Step 101 of FIG. 12, the discharging device 20 operates to discharge the fluid.

After the operation of the discharging device 20, when the controller 170 determines at Step 102 that the demand of refilling the discharging device 20 with the fluid is outputted, the control flow transits to Step 103. Here, the existence of the refill demand at Step 102 may be similar to that of Step 2 of the control flow illustrated in FIG. 7 described above. That is, the existence of the refill demand can be determined based on various criteria, such as the pressure sensor (not illustrated) which is detectable of the internal pressure of the discharge-side buffer part 22 provided to the discharging device 20 measures a pressure below the given pressure. If the existence of the fluid refill demand is confirmed at Step 102, the flow transits to Step 103.

At Step 103, the controller 170 controls the operation of the manipulator 90 so that the discharging device 20 moves to a given position on the refilling device 100 side. When the discharging device 20 reaches the given position, the controller 170 controls the operation at Step 104 in which the discharge-side coupler 82 is moved in the connecting direction (downward in the axial direction of the refill-side coupler 134 in this embodiment). Thus, the connection of the discharge-side coupler 82 to the refill-side coupler 134 is started. The movement of the discharging device 20 in the connecting direction is continued until the connection state detector (not illustrated) confirms the connection of the discharge-side coupler 82 to the refill-side coupler 134 at Step 105.

If the connection of the discharge-side coupler 82 to the refill-side coupler 134 is confirmed at Step 105, the control flow transits to Step 106, where the valve 106 is opened. Next, at Step 107, the supply of the fluid from the fluid feeder 160 to the refilling device 100 side is started. Then, the refill of the discharging device 20 with the fluid is continued until the refilled amount detector confirms the fully-refilled state at Step 108. Here, variety of refilled amount detector for detecting the refilled state of the fluid at Step 108 may be adopted similar to Step 10 of FIG. 7 described above.

If the discharging device 20 is fully refilled with the fluid, the control flow transits to Step 109. At Step 109, the valve 106 is closed. Then, at Step 110, the supply of the fluid from the fluid feeder 160 to the refilling device 100 side is stopped.

At Step 111, the controller 170 executes the operational control so that the discharge-side coupler 82 is moved in the separating direction (upward in the axial direction of the refill-side coupler 134 in this embodiment). Thus, the operation of disconnecting the discharge-side coupler 82 from the refill-side coupler 134 is started. The movement of the discharging device 20 in the disconnecting direction is continued until the connection state detector (not illustrated) is turned off at Step 112. If the connection state detector is turned off at Step 112, the controller 170 executes the operational control so that the discharging device 20 is moved to the given position at Step 113. Thus, the refill operation of the fluid illustrated in FIG. 12 is finished.

[Discharge-Side Coupler 82 and Refill-Side Coupler 134]

Although one example in which, the discharge-side coupler 82 is a male plug and the refill-side coupler 134 is a female plug is illustrated, the present invention is not limited to this structure. That is, the discharge-side coupler 82 may be a female plug and the refill-side coupler 134 may be a male plug so that the refill-side coupler 134 is inserted into the discharge-side coupler 82 when connecting the couplers for the fluid refilling.

Here, when comparing the adhered amount of the fluid associated with the fluid refilling operation between the male plug and the female plug, the adhered amount to the female plug is relatively less than that of the male plug. Thus, as described above, if the discharge-side coupler 82 on the discharging device 20 side which operates at the position near the workpiece to which the fluid is applied is the female plug, the adhesion of the fluid to the discharge-side coupler 82 can be minimized, and the fluid adhered to the discharge-side coupler 82 being unexpectedly fallen onto the workpiece can be prevented during the operation of the discharging device 20.

Further, if the discharge-side coupler 82 is the female plug, an entry of dust can be prevented when the discharge-side coupler 82 is oriented so that the terminal side faces downward as illustrated in FIG. 1. Therefore, dust preventing measures at the discharge-side coupler 82 may be unnecessary or simpler.

In addition, if the discharge-side coupler 82 is the female plug, it is desirable to attach the seal member 134$x$, such as an O-ring, onto the circumference of the refill-side coupler 134 which is the male plug as described in the embodiment. Thus, even if the fluid adheres to the inner circumferential surface of the discharge-side coupler 82, the effect of the seal member 134$x$ scrapping the fluid off the inner circumferential surface of the discharge-side coupler 82 can be expected when connecting or disconnecting the discharge-side coupler 82 to/from the refill-side coupler 134. Therefore, it is desirable to provide the seal member to the male plug which forms the refill-side coupler 134. Note that although the seal member 134$x$ may be attached to any locations, it is desirable to attach the seal member to a tip end side from the base end side of the male plug which forms the refill-side coupler 134, in order to improve the scrapping effect described above.

In the embodiment described above, although one example in which the discharge-side coupler 82 is moved toward the refill-side coupler 134 by the manipulator 90 when connecting the discharge-side coupler 82 to the refill-side coupler 134 is described, the present invention is not limited to this structure. That is, any other structures may also be adopted as long as the force that acts when connecting the discharge-side coupler 82 to the refill-side coupler 134 acts at the position on the axial line N, and the discharge-side coupler 82 and the refill-side coupler 134 are relatively movable with respect to each other.

Specifically, if a moving device that is capable of moving the refill-side coupler 134 upwardly, and the refill-side coupler 134 is brought close to the discharge-side coupler 82 disposed above the refill-side coupler 134 by operating the moving device, the force acts in the opposite direction from the example illustrated in the above embodiment, that is, upwardly along the axial line N. Here, if the upwardly acting force acts on the axial line N, the discharge-side coupler 82 and the refill-side coupler 134 move so as to be aligned with each other. Therefore, the wear associated with the sliding between the couplers is not caused. Alternatively, if the discharge-side coupler 82 is moved downwardly by the manipulator 90 while moving the refill-side coupler 134 upwardly so that the discharge-side coupler 82 and the refill-side coupler 134 relatively move in the given axial line N direction, the force that is caused associated with the connection acts on the axial line N and the discharge-side coupler 82 and the refill-side coupler 134 move so as to be aligned with each other. Therefore, the wear of both the couplers 82 and 134 is not caused.

Here, if the discharge-side coupler 82 is relatively moved with respect to the refill-side coupler 134 to connect the discharge-side coupler 82 to the refill-side coupler 134 as described above, it is desirable to minimize the load acting on the manipulator 90 at the time of connection. As one example of measures which address the problems concerned, there is a discharge system 200 illustrated in FIGS. 14A-B through 16A-16B. Hereinafter, the discharge system 200 is described in detail with reference to the accompanying drawings. Note that components common to the discharge system 10 described above are denoted with the same reference numerals and, thus, detailed description thereof may be herein omitted.

The discharge system 200 is significantly different in the structure from the discharge system 10 in a point that a disconnection preventive mechanism 210 is provided instead of the disconnection preventive mechanism 150, and a moving device 220 is provided. That is, in the discharge system 200, the pins 84 that constitute the disconnection preventive mechanism 150, and the sealed space forming body 132 provided with the latch grooves 144 are eliminated. Meanwhile, as the components that constitute the disconnection preventive mechanism 210, a stopped part 212 is provided to the discharging device 20 side, while a stopper 214 (stopper part) is provided to the refilling device 100 side. Further, the moving device 220 is provided as a device for moving the refill-side coupler 134.

Specifically, the stopped part 212 is a part that is supported in a cantilever fashion by the discharging device 20, above the discharge-side coupler 82 (i.e., at a position separated in the opposite direction from the connecting end of the discharge-side coupler 82). The stopped part 212 projects in a direction intersecting with (substantially perpendicular to, in this embodiment) the axial line N direction.

The stopper 214 is a member provided so that it can stop the stopped part 212. The stopper 214 is fixed to a support wall 228, which will be described later in detail. The stopper 214 projects in the direction intersecting with the axial line N (substantially perpendicular to, in this embodiment) above the refill-side coupler 134. The stopper 214 may be fixed at a given location in the axial line N direction (a height direction in the illustrated example), or may be adjustable of the location according to installation conditions.

The disconnection preventive mechanism 210 has a function to prevent a disconnection of the discharging device 20 from the refilling device 100 side, by the stopper 214 stopping the stopped part 212. That is, the disconnection preventive mechanism 210 becomes functional by disposing the stopped part 212 at a position adjacent to the stopper 214 on the refill-side coupler 124 side (downward in the illustrated example). In such a state, the stopped part 212 is hooked and stopped by the stopper 214 even when an external force acts on the discharging device 20 in a direction separating from the refilling device 100 and, thus, the discharging device 20 cannot separate from the refilling device 100.

In the discharge system 200, the disconnection preventive mechanism 210 becomes functional when the fluid is refilled from the refilling device 100 side to the discharging device 20. That is, when refilling the fluid, the manipulator 90 (not illustrated in FIGS. 14 to 16) moves the discharging device 20 so that the stopped part 212 reaches at the position adjacent to the stopper 214 on the refill-side coupler 134 side. Thus, the disconnection preventive mechanism 210 becomes in the state where it can demonstrate its function. In this state, the refill-side coupler 134 is connected to the discharge-side coupler 82 as described later in detail, and the fluid is then refilled. Therefore, even if a large force is acted associated with the connection of the refill-side coupler 134 and the discharge-side coupler 82, or the refilling of the fluid, the force can be received by the stopped part 212 and the stopper 214 and, thus, it can be prevented that a large load acts on the manipulator 90.

The moving device 220 is to move the refill-side coupler 134 in the axial line N direction (up-and-down directions in the illustrated example). The moving device 220 includes a body 222, a stage 224, an actuator 226, and the support wall 228. The body 222 has the actuator 226 therein. A base end part of the support wall 228 is fixed to a side surface 222b of the body 222.

The stage 224 is a plate-like part disposed substantially parallel to a top surface 222a of the body 222. The refilling device 100 is placed on the stage 224. The stage 224 is movable together with the refilling device 100 in directions approaching and separating to/from the top surface 222a (up-and-down directions in the illustrated example), while maintaining a substantially parallel attitude with respect to the top surface of the body 222.

The actuator 226 is to drive the stage 224 described above. The actuator 226 is comprised of an air cylinder or an electric actuator, for example. The actuator 226 includes three drive shafts 226a to 226c. The drive shafts 226a to 226c are shaft bodies that can extend and contract in directions parallel to the axial line N. The drive shafts 226a to 226c are disposed so as to be substantially parallel to each other. The drive shaft 226a is connected to a bottom surface of the stage 224, at a position on the axial line N of the refill-side coupler 134 (immediately below the refill-side coupler 134 in the illustrated example). The drive shafts 226b and 226c are connected to the bottom surface of the stage 224, and can extend and contract cooperatively with the drive shaft 226a. Therefore, the stage 224 can be moved in the axial line N direction while being maintained substantially parallel to the top surface 222a (substantially horizontal attitude) by extending and contracting the drive shafts 226a to 226c.

Figures 16A, 16B:
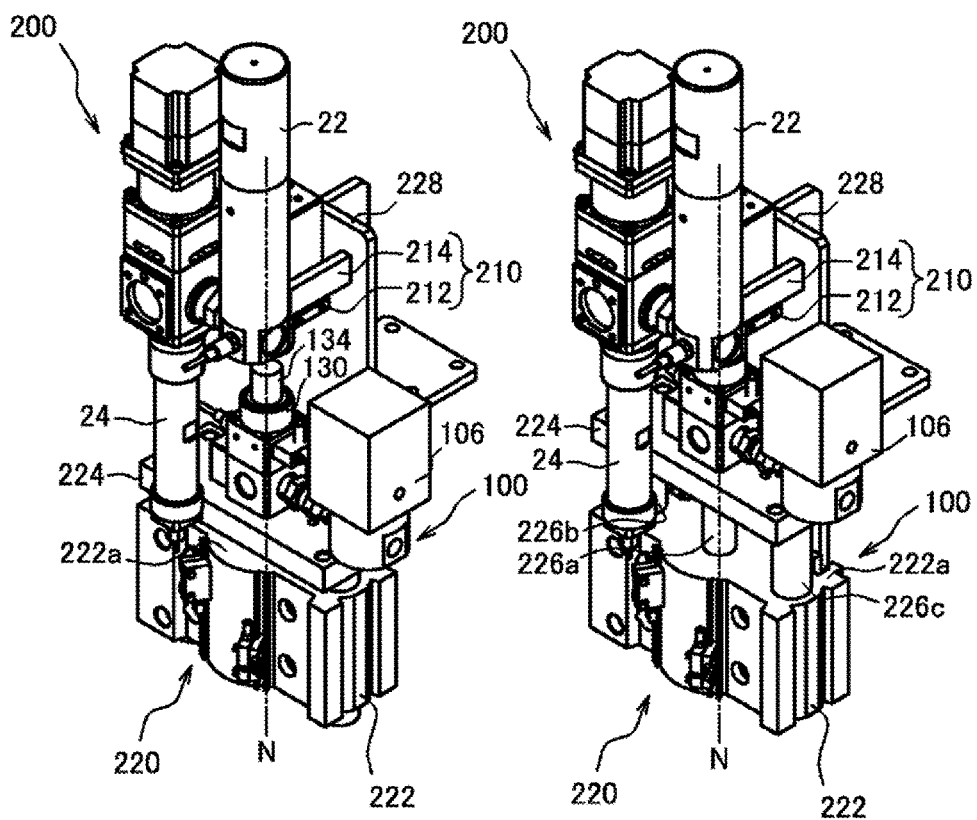
FIGS. 16A-16B are perspective views illustrating the discharge system of FIGS. 14A-14B, seen from a front right side, where

When refilling the discharging device 20 with the fluid in the discharge system 200, the controller 170 first actuate the manipulator 90 to move the discharging device 20 to the position near the refilling device 100. Then, as illustrated in FIGS. 15A and 16A, the manipulator 90 moves the discharging device 20 so that the stopped part 212 reaches the position on the refill-side coupler 134 side (downward in the illustrated example) with respect to the stopper 214. Thus, the stopped part 212 becomes in a state where it can be stopped by the stopper 214, i.e., the disconnection preventive mechanism 210 becomes in the state where it can demonstrate the function. Here, a clearance between the stopped part 212 and the stopper 214 can be suitably determined. Further, the position of the discharging device 20 is adjusted by the manipulator 90 so that the axial center positions of the discharge-side coupler 82 and the refill-side coupler 134 are aligned with each other.

When the discharging device 20 is located as described above, the controller 170 actuates the actuator 226 of the moving device 220 to ascend the stage 224, and moves the refill-side coupler 134 in the axial line N direction (upward in the illustrated example). Thus, the discharge-side coupler 82 and the refill-side coupler 134 are connected. Here, the stopper 214 contacts the stopped part 212 from rear in the axial line N direction, and the stopped part 212 is stopped by the stopper 214. Therefore, the discharging device 20 is held so as not to separate from the refilling device 100, and it can prevent that the load associated with the connection of the discharge-side coupler 82 and the refill-side coupler 134, or the refilling of the fluid acts on the manipulator 90.

In this embodiment, although the disconnection preventive mechanism 210 is illustrated as one capable of stopping by contacting the stopped part 212 to the stopper 214, the present invention is not limited to this structure. For example, a structure in which a gripper, such as a clamp, may be provided as the disconnection preventive mechanism 210 where opening and closing of the gripper can be controlled, and the discharging device 20 is held so that the discharging device 20 is not separated from the refilling device 100 by the gripper while gripping a part of the discharging device 20. Alternatively, for example, a fitting part, such as a hole into which the stopped part 212 can be fitted, may be formed, and the stopping may be achieved by fitting the stopped part 212 into the fitting part, without stopping by contacting the stopped part 212 to the stopper 214.

The application system of the present invention is suitably available in applications, such as applying fluid, such as sealing agent or adhesive, to various components at an automobile assembly plant etc., or refilling a container with fluid, such as grease.

The invention claimed is:

1. A discharge system comprising:
   a discharging device;
   a refilling device having a valve with an open and closed positions, said valve being configured to refill the discharging device with the fluid when being set at its open position;
   a discharge-side coupler provided at the discharging device side;
   a refill-side coupler provided at the refilling device side,
   wherein the refill-side coupler and the discharge-side coupler are connected to each other by relatively moving in a given axial line direction, and the discharging device side is refillable with the fluid from the refilling device side, and
   wherein the discharging device includes a bracket whose orientation is configured to be along an axial line of the discharge-side coupler,
   the discharging device is connected to a manipulator configured to move said discharging device by attaching to an end of said bracket,
   an axial line of said bracket and a coupling position between the manipulator and the bracket are located on the given axial line when the refill-side coupler and the discharge-side coupler are connected to each other, and
   a force acting in association with the connection of the refill-side coupler and the discharge-side coupler acts on the coupling position as a point of action along the given axial line direction.

2. The discharge system of claim 1, wherein a coupling position between the manipulator and the discharging device reaches on the axial line when connecting the refill-side coupler and the discharge-side coupler.

3. The discharge system of claim 1, wherein the discharging device includes a uniaxial eccentric screw pump having a male screw rotor that is eccentrically rotated by a drive force, and a stator of which an inner circumferential surface is formed in a female screw.

4. The discharge system of claim 1 further comprising:
   a moving device coupled to the refilling device so as to move the refill-side coupler in the axial line direction by an actuator; and
   a disconnection preventive mechanism for preventing a disconnection between the discharging device and the refilling device, wherein the disconnection preventive mechanism includes:
      a stopped part provided to the discharging device, and
      a stopper part that is stoppable of the stopped part,
   wherein when the stopped part is stopped by the stopper part, the refill-side coupler and the discharge-side coupler are connectable to each other by moving the refill-side coupler in the axial line direction while prohibiting a movement of the discharging device in a direction separating from the refilling device.

5. The discharge system of claim 4, wherein the stopper part is stoppable by contacting the stopped part from rear in the axial line direction.

* * * * *